US011288937B2

(12) United States Patent
Siu et al.

(10) Patent No.: US 11,288,937 B2
(45) Date of Patent: Mar. 29, 2022

(54) SECURITY CAMERA SYSTEM WITH MULTI-DIRECTIONAL MOUNT AND METHOD OF OPERATION

(71) Applicant: Sensormatic Electronics, LLC, Boca Raton, FL (US)

(72) Inventors: Patrick Siu, Tyngsborough, MA (US); Christopher Cianciolo, Westford, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 620 days.

(21) Appl. No.: 15/818,816

(22) Filed: Nov. 21, 2017

(65) Prior Publication Data
US 2019/0005788 A1    Jan. 3, 2019

Related U.S. Application Data

(63) Continuation-in-part of application No. 15/638,711, filed on Jun. 30, 2017.
(Continued)

(51) Int. Cl.
*H04N 5/247* (2006.01)
*G08B 13/196* (2006.01)
(Continued)

(52) U.S. Cl.
CPC ........ *G08B 13/19619* (2013.01); *G01S 17/04* (2020.01); *G08B 13/19632* (2013.01);
(Continued)

(58) Field of Classification Search
CPC ........ G11B 19/20; H04N 5/772; H04N 5/247; H04N 5/23238; H04N 13/0282;
(Continued)

(56) References Cited

U.S. PATENT DOCUMENTS

| 5,818,519 A | 10/1998 | Wren |
| 5,878,151 A | 3/1999 | Tang et al. |

(Continued)

FOREIGN PATENT DOCUMENTS

| DE | 10 2006 004731 | 8/2007 |
| EP | 1 594 322 | 11/2005 |

(Continued)

OTHER PUBLICATIONS

International Preliminary Report on Patentability, dated Jan. 9, 2020, from International Application No. PCT/US2018/039895, filed on Jun. 28, 2018. 10 pages. (WO1).

(Continued)

*Primary Examiner* — Patrick E Demosky
(74) *Attorney, Agent, or Firm* — HoustonHogle LLP

(57) ABSTRACT

A security camera system includes a base unit and sensor modules for generating image data. The base unit includes several mounting sockets arranged at different elevational and azimuthal directions around the base unit, and the sensor modules attach, for example, magnetically, to the mounting sockets. Each mounting socket includes a socket ID, which is used to stitch together the image data from different sensor modules. The security camera system is capable of automatic detection of the location of the sensor modules, as the socket IDs for the mounting sockets to which the sensor modules are attached are identified by various means including readable indicia and reader modules including optical codes and readers, membrane switches, optical sensors, and radio-frequency identification tags and readers.

12 Claims, 16 Drawing Sheets

Related U.S. Application Data

(60) Provisional application No. 62/566,114, filed on Sep. 29, 2017.

(51) Int. Cl.
*H04N 5/232* (2006.01)
*G01S 17/04* (2020.01)
*G06K 7/10* (2006.01)

(52) U.S. Cl.
CPC ... *G08B 13/19634* (2013.01); *H04N 5/23241* (2013.01); *G06K 7/10623* (2013.01)

(58) Field of Classification Search
CPC ............. H04N 13/0055; H04N 13/111; H04N 13/189; H04N 13/271; H04N 5/2258; H04N 13/106; H04N 13/243; H04N 5/23241; G06T 3/4038; G06T 1/0007; G06Q 30/0263; G08B 13/19619; G08B 13/19632; G08B 13/19634; G01S 17/026; G06K 7/10623
See application file for complete search history.

(56) References Cited

U.S. PATENT DOCUMENTS

| | | | |
|---|---|---|---|
| 6,002,995 A | 12/1999 | Suzuki et al. | |
| 6,476,856 B1 | 11/2002 | Zantos | |
| 6,768,563 B1 | 7/2004 | Murata et al. | |
| 6,799,047 B1 | 9/2004 | Bahl et al. | |
| 6,839,560 B1 | 1/2005 | Bahl et al. | |
| 6,898,432 B1 | 5/2005 | Jiang | |
| 6,947,059 B2 | 9/2005 | Pierce et al. | |
| 7,680,192 B2 | 3/2010 | Kaplinsky | |
| 7,903,871 B2 | 3/2011 | Kaplinsky et al. | |
| 7,922,329 B1 | 4/2011 | Graether | |
| 8,456,513 B2 | 6/2013 | Raynor | |
| 9,227,568 B1 | 1/2016 | Hubbell et al. | |
| 9,430,781 B1 | 8/2016 | Kerr et al. | |
| 9,438,782 B2 | 9/2016 | Donaldson | |
| 9,690,172 B2 | 6/2017 | Donaldson | |
| 9,876,953 B2 | 1/2018 | Bagnato et al. | |
| 9,911,454 B2 | 3/2018 | van Hoff et al. | |
| 10,057,487 B1 | 8/2018 | Chen | |
| 2001/0024233 A1 | 9/2001 | Urisaka et al. | |
| 2001/0056574 A1 | 12/2001 | Richards | |
| 2002/0095486 A1 | 7/2002 | Bahl | |
| 2003/0118015 A1 | 6/2003 | Gunnarsson et al. | |
| 2004/0105005 A1 | 6/2004 | Yamamoto et al. | |
| 2004/0152471 A1 | 8/2004 | MacDonald et al. | |
| 2004/0166878 A1 | 8/2004 | Erskine et al. | |
| 2004/0203482 A1 | 10/2004 | Bacon et al. | |
| 2004/0263609 A1 | 12/2004 | Otsuki et al. | |
| 2005/0128286 A1 | 6/2005 | Richards | |
| 2005/0130677 A1 | 6/2005 | Meunier et al. | |
| 2005/0190972 A1 | 9/2005 | Thomas et al. | |
| 2005/0207487 A1 | 9/2005 | Monroe | |
| 2005/0208952 A1 | 9/2005 | Dietrich et al. | |
| 2006/0014548 A1 | 1/2006 | Bolin et al. | |
| 2006/0017842 A1 | 1/2006 | Jun | |
| 2006/0050149 A1 | 3/2006 | Lang et al. | |
| 2006/0066723 A1 | 3/2006 | Iwase et al. | |
| 2007/0042706 A1 | 2/2007 | Ledeczi et al. | |
| 2007/0109407 A1 | 5/2007 | Thompson | |
| 2007/0185980 A1 | 8/2007 | Abraham et al. | |
| 2007/0188653 A1* | 8/2007 | Pollock .............. | H04N 5/23248 348/373 |
| 2007/0241965 A1 | 10/2007 | Kolavennu | |
| 2008/0004888 A1 | 1/2008 | Davis et al. | |
| 2008/0039114 A1 | 2/2008 | Phatak et al. | |
| 2008/0112699 A1 | 5/2008 | Huseth et al. | |
| 2008/0180537 A1* | 7/2008 | Weinberg .............. | H04N 5/2256 348/211.99 |
| 2009/0303329 A1 | 12/2009 | Morisaki | |
| 2010/0079599 A1 | 4/2010 | Kanma | |
| 2010/0225738 A1 | 9/2010 | Webster | |
| 2010/0250369 A1 | 9/2010 | Peterson et al. | |
| 2011/0096166 A1 | 4/2011 | Englander et al. | |
| 2011/0134240 A1 | 6/2011 | Anderson et al. | |
| 2011/0168783 A1* | 7/2011 | Yoder .................... | G01T 1/105 235/492 |
| 2011/0231092 A1 | 9/2011 | Kuo et al. | |
| 2012/0169842 A1* | 7/2012 | Chuang ............ | G08B 13/19619 348/39 |
| 2012/0229672 A1 | 9/2012 | Cok et al. | |
| 2012/0242788 A1 | 9/2012 | Chuang et al. | |
| 2013/0170378 A1 | 7/2013 | Ray et al. | |
| 2014/0135042 A1 | 5/2014 | Buchheim et al. | |
| 2014/0146132 A1 | 5/2014 | Bagnato et al. | |
| 2014/0264047 A1 | 9/2014 | Valentino et al. | |
| 2014/0327733 A1 | 11/2014 | Wagreich | |
| 2014/0327770 A1 | 11/2014 | Wagreich | |
| 2014/0354828 A1 | 12/2014 | Rubinstein et al. | |
| 2015/0103171 A1 | 4/2015 | Cho | |
| 2015/0172518 A1 | 6/2015 | Lucas et al. | |
| 2015/0247912 A1 | 9/2015 | Tang et al. | |
| 2015/0341210 A1 | 11/2015 | Ranbro | |
| 2015/0348580 A1* | 12/2015 | van Hoff ............... | G06T 3/4038 348/38 |
| 2016/0037085 A1 | 2/2016 | Mills et al. | |
| 2016/0173737 A1 | 6/2016 | Cho | |
| 2016/0182826 A1 | 6/2016 | Blum et al. | |
| 2016/0357092 A1 | 12/2016 | Donaldson | |
| 2016/0366336 A1 | 12/2016 | Kuehnle et al. | |
| 2017/0052247 A1 | 2/2017 | Kong et al. | |
| 2017/0055131 A1 | 2/2017 | Kong et al. | |
| 2017/0278365 A1 | 9/2017 | Madar et al. | |
| 2018/0018023 A1* | 1/2018 | Nakamura ............ | G06F 1/1626 |
| 2018/0268868 A1 | 9/2018 | Salokannel et al. | |
| 2018/0350100 A1 | 12/2018 | Hanson et al. | |

FOREIGN PATENT DOCUMENTS

| | | |
|---|---|---|
| EP | 2 110 795 | 10/2009 |
| EP | 2 791 868 | 6/2017 |
| WO | WO 2004042667 | 5/2004 |

OTHER PUBLICATIONS

Afshari, H., et al., "The PANOPTIC Camera: A Plenoptic Sensor with Real-Time Omnidirectional Capability," J. Sign Process Syst., 70: 305-328 (2013).

International Preliminary Report on Patentability, dated Apr. 9, 2020, from International Application No. PCT/US2018/052901, filed on Sep. 26, 2018. 10 pages. (WO2).

International Preliminary Report on Patentability, dated Apr. 9, 2020, from International Application No. PCT/US2018/052908 filed on Sep. 26, 2018. 8 pages. (WO3).

Partial Search Report of the International Searching Authority, dated Oct. 10, 2018, from International Application No. PCT/US2018/039895, filed on Jun. 28, 2018. 9 pages.

Axis Q3709-PVE Network Camera: data sheet, 2015: Axis Communications AG. Two pages.

Dahua Technology: Multi-Sensor Panoramic Camera DH-IPC-PFW8601N-H-A180: data sheet, earlier than Jun. 8, 2017: www.dahuasecurity.com. Three pages.

Hikvision DS-2CD6986F-(H) Pano-vu Series Panoramic Dome Camera: specification, 2015: Hikvision Digital Technology Co., Ltd. Four pages.

Hikvision DS-2DP1636-D Pano-vu Series 360 degree Panoramic Camera: specification, 2015: Hikvision Digital Technology Co., Ltd. Four pages.

Optera IMM Series with SureVision 2.0 180 degree, 270 degree, 360 degree Panoramic, 12 MPX IP Cameras: specification, earlier than Jun. 8, 2017: Pelco by Schneider Electric. Six pages.

Vivotek S Series MS8391-EV Multiple Sensor Network Camera: data sheet, earlier than Jun. 8, 2017: Vivotek Inc. Three pages.

Vivotek S Series MS8392-EV Multiple-Sensor Dome Network Camera: data sheet, earlier than Jun. 8, 2017: Vivotek Inc. Three pages.

(56) References Cited

OTHER PUBLICATIONS

Wisenet PNM-9020V 7.3 Megapixel Multi-Sensor 180 degree Panoramic Camera: data sheet, earlier than Jun. 8, 2017: Hanwha Techwin Co., Ltd. One page.
International Search Report and Written Opinion of the International Searching Authority, dated Dec. 19, 2018, from International Application No. PCT/US2018/052908 filed on Sep. 26, 2018. 14 pages. (WO3).
International Search Report and Written Opinion of the International Searching Authority, dated Dec. 7, 2018, from International Application No. PCT/US2018/039895, filed on Jun. 28, 2018. 17 pages. (WO1).
International Search Report and Written Opinion of the International Searching Authority, dated Feb. 18, 2018, from International Application No. PCT/US2018/052901, filed on Sep. 26, 2018. 18 pages. (WO2).
Partial Search Report of the International Searching Authority, dated Dec. 18, 2018, from International Application No. PCT/US2018/052901, filed on Sep. 26, 2018. 11 pages. (WO2).

\* cited by examiner

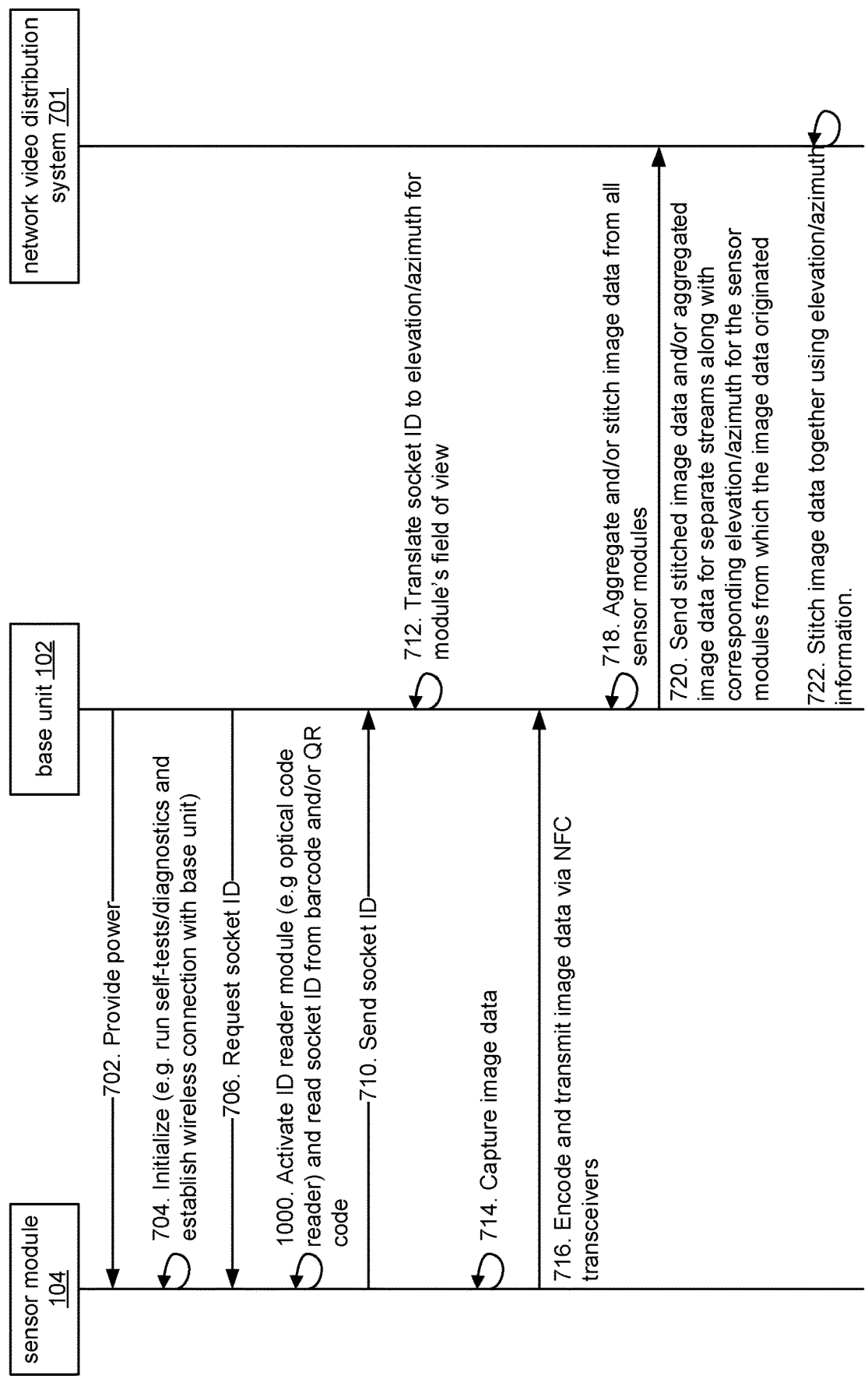

SECURITY CAMERA SYSTEM WITH MULTI-DIRECTIONAL MOUNT AND METHOD OF OPERATION

RELATED APPLICATIONS

This application claims the benefit under 35 USC 119(e) of U.S. Provisional Application No. 62/566,114, filed on Sep. 29, 2017, and this application is also a Continuation In Part of U.S. patent application Ser. No. 15/638,711, filed on Jun. 30, 2017. Both of the above referenced applications are incorporated herein by reference in their entirety.

This application is related to U.S. application Ser. No. 15/818,818, filed on Nov. 21, 2017 and published as U.S. Patent Publication No.: 2019/0104282, and U.S. application Ser. No. 15/818,821, filed on Nov. 21, 2017 and published as U.S. Patent Publication No.: 2019/0102903.

BACKGROUND OF THE INVENTION

Video surveillance, e.g., security, systems are often deployed in and around buildings as well as in metropolitan settings. Example buildings and metropolitan settings include schools, government buildings, commercial buildings, residential buildings, multi dwelling units, roads and highways, and town and city centers.

These video security systems typically include surveillance, e.g., security, cameras that connect via a security network to a control system. Additional components include network video recorder (NVR) systems, also known as video management systems, and monitors for displaying images such as video from the security cameras.

The security cameras typically have a lenses and imager systems that are fixed, adjustable, or motorized. A fixed security camera will have the lens and imager system permanently fixed in a set position (i.e., lens and imager system cannot change position with respect to camera body). On the other hand, an adjustable security camera's lens and imager system is movable with respect to camera body (e.g., installer can move the lens and imager system to different positions) so that it can be pointed down a hall or at a door, for example. A motorized security camera, such as a pan-tilt-zoom (PTZ) security camera, utilizes motor(s) to automatically move the lens and imager system to different positions usually under operator or automatic control.

Multi-sensor security cameras, also known as multi-imager cameras, have also been deployed to capture a wide field of view. A typical multi-sensor security camera comprises two to four sensor modules. Each sensor module has a lens and imager system. The sensor modules are positioned or repositioned to cover the panoramic field of view while minimizing or eliminating blind spots. Typically, multi-sensor security cameras are designed either with sensor modules that are fixed in place or with a mechanical positioning system that can tilt the sensor modules up and down or sideways according to the specific mechanical design of the security camera system.

More recently, security cameras have been proposed that implement a single, universal design for a security camera system with a variable number of sensor modules and fields of view. An example of one such system is described in U.S. patent application Ser. No. 15/638,711 to Siu, entitled "SECURITY CAMERA SYSTEM WITH MULTI-DIRECTIONAL MOUNT AND METHOD OF OPERATION", which is incorporated herein by reference in its entirety. The security camera system includes a base unit, including a mounting dome, the surface of which includes several mounting sockets to which a variable number of sensor modules are attached mechanically or magnetically. The sensor modules can be powered wirelessly via magnetic induction. Similarly, the sensor modules might communicate with a base unit of the security camera system via low power wireless technology such as Bluetooth Low Energy (BLE), near-field communication (NFC), LiFi, and visible light communication (VLC), among other examples. The availability of several mounting sockets on the mounting dome provides practically unlimited arrangements of sensor modules, eliminating the blind spots imposed by previous mechanical designs. The variable number of sensor modules also allows for a single, universal design, regardless of the desired field of view of the security camera system, significantly reducing the complexity and cost of design, manufacturing and installation, as well as the development cycle time.

SUMMARY OF THE INVENTION

The flexibility offered by these multi-sensor security camera systems in creating customized panoramic fields of view by attaching different combinations of sensor modules to different mounting sockets of a mounting dome presents an additional challenge of determining the location and orientation of the sensor modules and associating the location and orientation of the different sensor modules with image data captured by those sensor modules in order to perform image stitching and other image analytics functions.

The present invention concerns the automatic detection of each sensor module's location on the mounting dome.

In one embodiment, optical codes, and optical code readers are utilized. For example, each mounting socket might include an optical code such as a bar code or a matrix barcode (such as a Quick Response (QR) code), and on the bottom surface of each sensor module is an optical reader for scanning the optical codes.

In another embodiment, each mounting socket includes an associated physical button or electronic sensor. When a sensor module is positioned in that location, the physical button is depressed or the electronic sensor senses the presence of the sensor module. In either case, a signal is sent to the control electronics in the base unit indicating the position of the sensor module.

In a specific example, the electronic sensor can comprise an optical beam and receiver positioned in the location where the sensor module is positioned. When the sensor module is placed on the dome, the optical beam is interrupted and a corresponding signal is sent to the control electronics indicating where the sensor module was placed on the dome.

In another example, the electronic sensor can comprise electrical contacts placed in selected locations around the dome where sensor modules might be installed. When the sensor module is placed in one of the designated locations, the electrical contacts are shorted together. In response, a signal is sent back to the control electronics indicating which location was selected for the sensor module.

Another embodiment uses radio-frequency identification (RFID) technology. In one example, an RFID tag is located in each mounting socket. When the sensor module is attached, an RFID reader on the sensor module reads the RFID tag on the socket and reports its position to the control electronics or control software. Alternatively, the RFID tag could be located on the sensor module, and an RFID reader on the mounting socket reads it and sends a signal to the control electronics in the base unit indicating the location of the sensor module.

In general, according to one aspect, the invention features a security camera system comprising a base unit and sensor modules for generating image data. The base unit includes a plurality of mounting points, at which the sensor modules attach to the base unit. Readable indicia and readers of the readable indicia are used to determine a relationship between the mounting points and the sensor modules.

In embodiments, the readable indicia are barcodes and/or matrix barcodes, and the readers are optical code readers, or the readable indicia are radio-frequency identification tags, and the readers are radio-frequency identification readers. The readers can be components of the sensor modules, in which case the readable indicia are associated with the mounting points and provide identification information for the mounting points, which is sent by the sensor modules to the base unit. On the other hand, the readers can be associated with the mounting points, in which case the readable indicia are associated with the sensor modules.

In general, according to another aspect, the invention features a security camera system comprising a base unit and sensor modules for generating image data. The base unit includes a plurality of mounting points, at which the sensor modules attach to the base unit. The mounting points include sensors for detecting the presence of an attached sensor module.

In embodiments, the sensors include membrane switches, which are activated by attached sensor modules compressing the membrane switches, or optical sensors that detect attachment of the sensor modules by detecting interruption of transmission of light between optical transmitters and receivers of the optical sensors.

In general, according to another aspect, the invention features a method for configuring a multi-sensor security camera system including a base unit with a plurality of mounting points and sensor modules for attaching to the base unit at the mounting points and generating image data. Readers are used to read readable indicia for the mounting points and the sensor modules, and a relationship between the mounting points and the sensor modules is determined based on the reading of the readable indicia.

In general, according to another aspect, the invention features a method for configuring a multi-sensor security camera system including a base unit with a plurality of mounting points and sensor modules for attaching to the base unit at the mounting points and generating image data. The sensor modules are attached to the mounting points, and sensors of the mounting points detect the presence of the attached sensor modules.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 7 is a sequence diagram illustrating the process by which the sensor module reads the optical code and sends the socket identification (ID) to the base unit, which then reports to a network video distribution system;

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
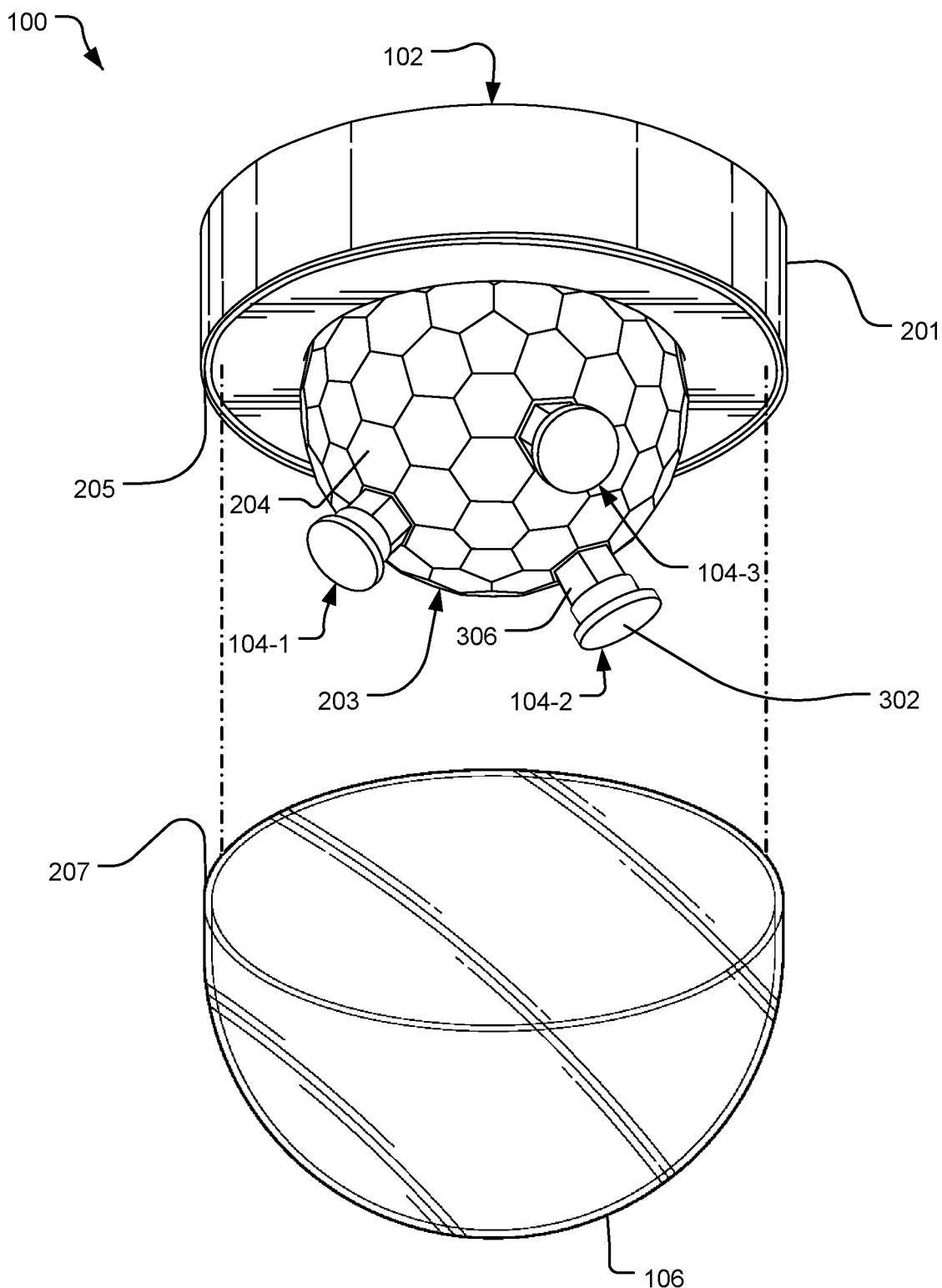
FIG. 1 is a perspective view of a security camera system to which the present invention is applicable, in which a transparent bubble is shown exploded off the security camera system.

FIG. 1 is a perspective view of a security camera system 100 to which the present invention is applicable.

The security camera system 100 includes a base unit 102, sensor modules 104 and a transparent bubble 106. The transparent bubble 106 is shown exploded off the security camera system 100.

The base unit 102 includes a camera base 201 and a mounting dome 203. The camera base 201 is a cylindrical assembly, a top circular surface of which faces and attaches to a surface of a building or other structure on which the security camera system 100 is mounted, typically a ceiling or wall or mounting bracket. The mounting dome 203 is a dome, such as a hemispherical dome, protruding from a bottom circular surface of the camera base 201 to which the sensor modules 104 attach.

The mounting dome 203 includes several mounting points, which are particular locations on the surface of the mounting dome at which sensor modules 104 are attached to the mounting dome 203 of the base unit 102. In the illustrated example, the mounting points are mounting sockets 204, which are identically-sized regions of the surface of the mounting dome 203 defined by raised ridges along the perimeters of the sockets and/or depressed regions within the interior of the sockets. The mounting sockets 204 are arrayed across the entire round surface of the mounting dome 203 such that the mounting sockets 204 face radially outward from a center of the hemispherical mounting dome 203 at regularly spaced intervals. Other examples of mounting points can include mesas and/or raised regions of the surface of the mounting dome 203, or even undifferentiated points on the surface of the mounting dome 203, among other examples.

In the illustrated example, the mounting sockets 204 are hexagonal depressions. The front portion of the mounting dome 203 (visible in the illustration) includes about thirty mounting sockets 204, and the mounting dome 203 in its entirety (including portions of the mounting dome 203 not visible in the illustration) would have about sixty mounting sockets 204 in total, as the mounting sockets 204 extend to cover the entire outer surface of the mounting dome 203.

In alternative embodiments, the mounting sockets 204 can be other shapes such as circles, octagons, pentagons, or triangles, among other examples. The size and number of the mounting sockets 204 could also vary, based on the different embodiments. In general, there are at least 4 mounting sockets, but 10, 15, or 20 or more is preferred. Regions between the mounting sockets 204 can separate the different mounting sockets 204, or the mounting sockets 204 can tile across the surface of the mounting dome 203 without any regions between the mounting sockets 204.

In general, the mounting sockets 204 represent regions of the mounting dome 203 to which the sensor modules 104 can be attached.

Each sensor module 104 includes a proximal end and a distal end. The distal end engages the exterior surface of the mounting dome 203 at a particular mounting point. At the distal end of the sensor module is a mounting plug 306. The mounting plug 306 is prismatic shaped in the illustrated embodiment, with a distal exterior surface sharing the same shape and approximate size as each of the mounting sockets 204 and engaging with the exterior surface of the mounting dome 203 within the perimeter of one of the mounting sockets 204.

In the illustrated example, the mounting plug 306 is a hexagonal prism, matching the hexagonal shape of the mounting sockets 204 depicted in the same illustration. However, in other embodiments in which the mounting sockets 204 take different shapes, the distal surface of the module mounting plug 306 would correspond to the shape of the mounting sockets 204.

At the proximal end of the sensor module 104 is a lens system 302, which is encased in a cylindrical assembly. In general, the sensor module 104 generates image data from light captured via the lens system 302, with the lens system forming an image of that light onto an image sensor, inside the module.

The sensor modules 104 are attached to the mounting dome 203 such that their optical axes extend radially from the center of the mounting dome 203 in different elevational and azimuthal directions, corresponding to the positions of the different mounting sockets 204 along the surface of the dome. In general, the number of sensor modules 104 and the selection of mounting sockets 204 to which the modules attach determines a field of view of the security camera system 100.

The transparent bubble 106 is a hollow, rigid, hemisphere of transparent material. A circular rim 207 (forming the perimeter of a circular, flat face of the transparent bubble 106) inserts into an attachment ridge 205 along the perimeter of the bottom face of the camera base 201 and is secured via an attachment mechanism such as a snap fit.

The transparent bubble 106 is secured to the camera base 201 such that it encases the mounting dome 203 and attached sensor modules 104.

Figure 2:
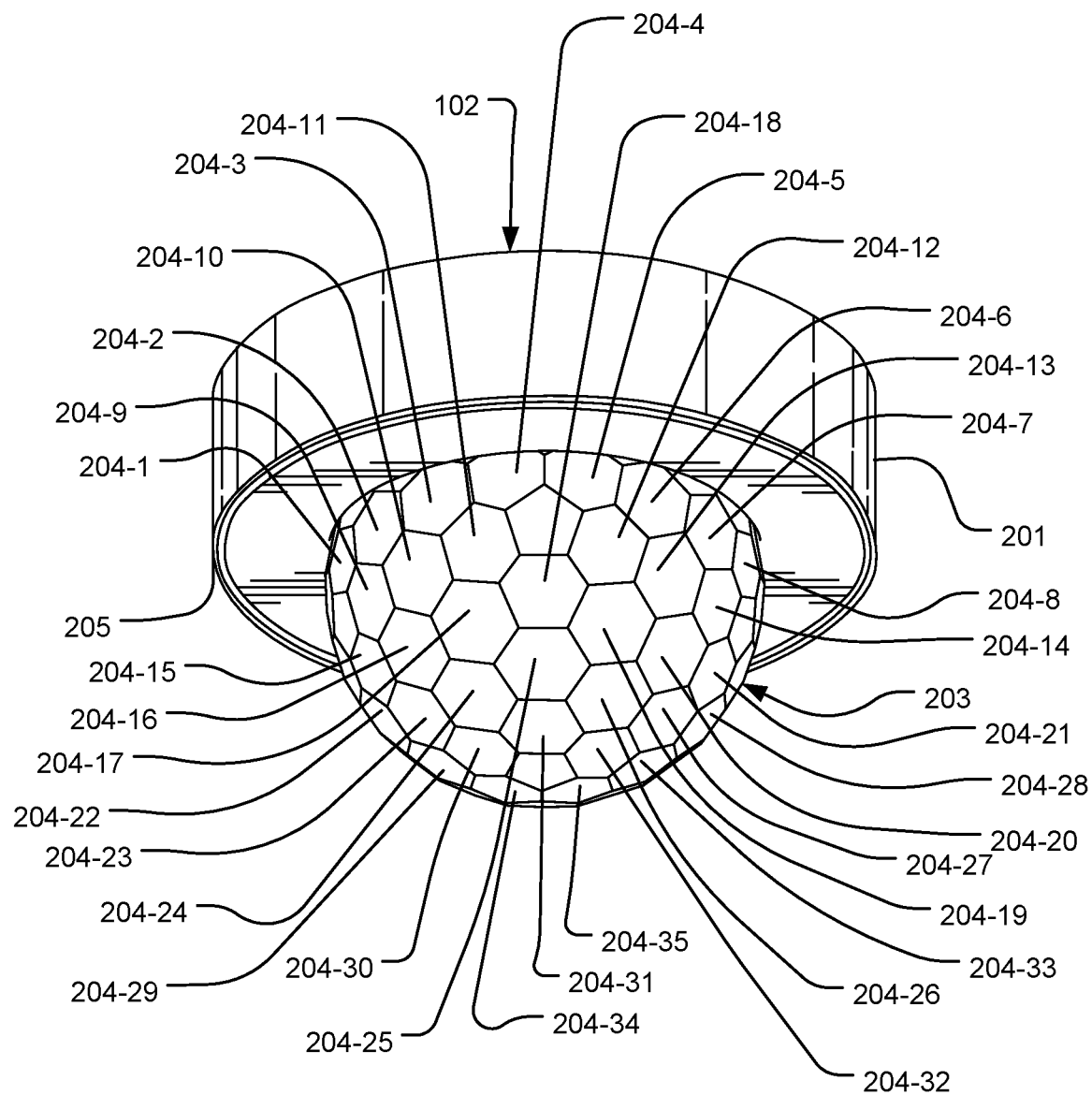
FIG. 2 is a perspective view of a base unit of the security camera system.

FIG. 2 is a perspective view of the base unit 102 of the security camera system 100 without any sensor modules 104 attached to it, depicting the camera base 201, mounting dome 203, mounting sockets 204 and attachment ridge 205. Here more of the mounting sockets have been labeled, specifically 204-1 to 204-35, to illustrate the number of potential locations at which the modular sensor modules 104 can be installed. A similar number of mounting sockets are available on the backside of the unit, but not shown in this view.

Figure 3:
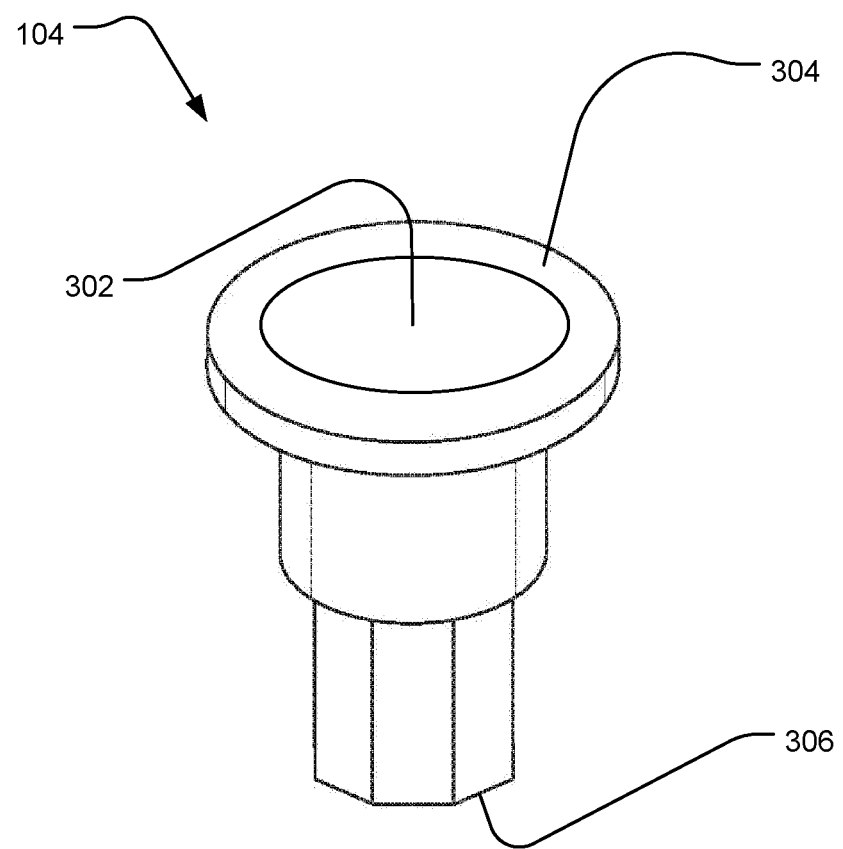
FIG. 3 is a perspective view of a sensor module of the security camera system.

FIG. 3 is a perspective view of the sensor module 104, depicting the lens system 302 and module mounting plug 306.

Also shown is a bubble contact ring 304, which is a ring of elastic material that compresses around the proximal end of the assembly containing the lens system 302 defining the module's entrance aperture. An interior surface of the transparent bubble 106 presses against the bubble contact ring 304 preventing movement and/or vibration of the sensor modules 104 and urging the sensor modules into their respective sockets.

Figure 4:
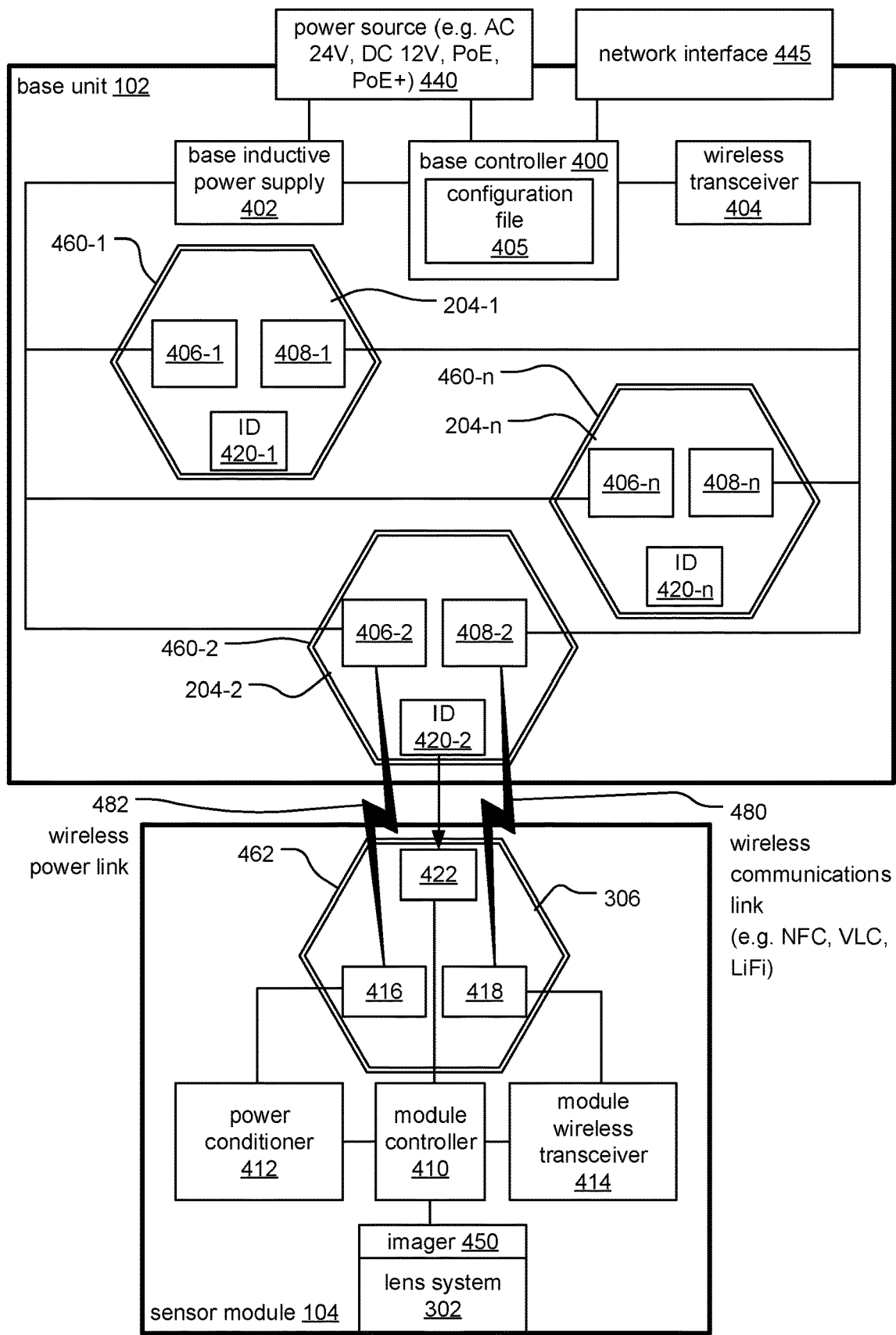
FIG. 4 is a schematic diagram of the base unit and the sensor module according to one embodiment of the present invention.

FIG. 4 is a schematic diagram of the base unit 102 and the sensor module 104 according to one embodiment of the current invention.

The base unit 102 includes a power source 440, a base inductive power supply 402, a base controller 400, a wireless transceiver 404, a network interface 445, and several mounting sockets 204. In the figure, only 3 mounting sockets are shown, but in the typical embodiment, the number of mounting sockets 204 would be at least 4, but typically 10 or more are provided. Each mounting socket includes a socket magnetic mount 460, an inductive power transmitter 406, a wireless antenna 408, and a socket identification (ID) module 420.

The sensor module 104 includes a module controller 410, a power conditioner 412, a module wireless transceiver 414, a lens system 302 and imager 450, and a module mounting plug 306, which includes a module magnetic mount 462, an inductive power receiver 416, a wireless antenna 418 and an ID reader module 422.

In general, the sensor module 104 generates image data. Incoming light is collected and focused by the lens system 302 on an imager 450, such as a CCD or CMOS imager. The image data is sent the base unit 102. The base unit 102 receives image data from one or more sensor modules 104 and associates the image data from each sensor module 104 with elevation and azimuth information associated with the mounting socket 204 to which the sensor module 104 is attached.

The power source 440 provides power to the components of the base unit 102 including the base controller 400 and the base inductive power supply 402. In different examples, the power source can be a battery, an AC 24V power supply, a DC 12V power supply, or a power supply utilizing Power over Ethernet (PoE) or PoE+ technologies.

The base controller 400 executes firmware instructions and, in general, sends instructions to and receives data from the base inductive power supply 402, sensor modules 104 via the wireless transceiver 404 and wireless antenna(s) 408, and the network interface 445. More specifically, the base controller 400 receives image data from the sensor modules 104 and sends it to a network video distribution system 701 via the network interface 445.

In the illustrated embodiment, the base unit 102 wirelessly provides power to the sensor modules 104 via the base inductive power supply 402, inductive power transmitters 406, inductive power receivers 416, and the power conditioner 412. When the sensor module 104 is attached to the mounting socket 204-2, the inductive power transmitter 406-2 at or near the surface of the mounting dome 203 in the region containing the mounting socket 204-2 come into proximity with the inductive power receiver 416 of the sensor module 104. The base inductive power supply 402 supplies an alternating current to the inductive power transmitter 406, which is, for example, a coil. An oscillating magnetic field is formed, which induces an alternating current in the inductive power receiver 416, as illustrated as a wireless power link 482. This alternating current is then conditioned by the power conditioner 412, for example, by converting it to direct current to power the sensor module 104.

The module controller 410 receives power from the power conditioner 412 and image data from the imager 450 (based on light captured by the lens system 302). The module controller 410 also sends instructions to and receives ID information (for the mounting socket 204 to which the sensor module 104 is attached) to and from the ID reader module 422. The module controller 410 sends the image data and the ID information to the base unit 102 via the wireless transceiver 414.

The base wireless transceiver 404 and the module wireless transceiver 414 wirelessly (e.g. via near-field communication, visible light communication or LiFi technologies) send and receive information to each other via a wireless communications link 480 between the base wireless antenna 408 and the module wireless antenna 418, respectively.

In general, the socket ID module 420 is a physical representation of a socket ID, which, in turn, is a unique identifier associated with each mounting socket 204. The socket ID is detected by the ID reader module 422 interacting with the socket ID module 420.

A configuration file 405 of the base unit 102 (for example, stored in nonvolatile memory of the base controller 400) includes information about the elevation and azimuth associated with the different fields of view from the mounting sockets 204. In the illustrated embodiment, in which each mounting socket 204 includes a socket ID module 420, the configuration file 405 directly associates the elevation and azimuth information for the different mounting sockets 204 with the socket IDs of the mounting sockets 204 (for example, in a table). In other examples, however, the configuration file 405 includes other identification information in addition to or instead of the socket IDs, including identification and/or address information for reader modules or sensors of the base unit 102 that are used to identify the mounting socket 204 to which the sensor module 104 is attached. Typically, this mapping of elevation and azimuth information to mounting sockets 204, using socket IDs and/or other identification information, was provided during an initial configuration of the base unit 102 during manufacturing.

The sensor modules 104 attach to the mounting sockets 204 via the socket magnetic mount 460 and the module magnetic mount 462. In one example, the magnetic mounts 460, 462 are formed of ferromagnetic material and/or magnets that are attracted to each other.

In the illustrated example, three mounting sockets 204-1, 204-2, 204-n are depicted, and the sensor module 104 is attached to mounting socket 204-2. The sensor module 104 would be attached to the mounting socket 204-2 in such a way to allow the inductive transmitter 406-2, wireless transceiver 408-2 and socket ID module 420-2 of the mounting socket 204-2 to interface with the inductive power receiver 416, wireless transceiver 418 and ID reader module 422 of the sensor module 106. In different examples, this may involve the components of the mounting socket 204 to come in direct contact with their counterparts on the sensor module 104, or to simply come in close proximity.

Figure 5A:
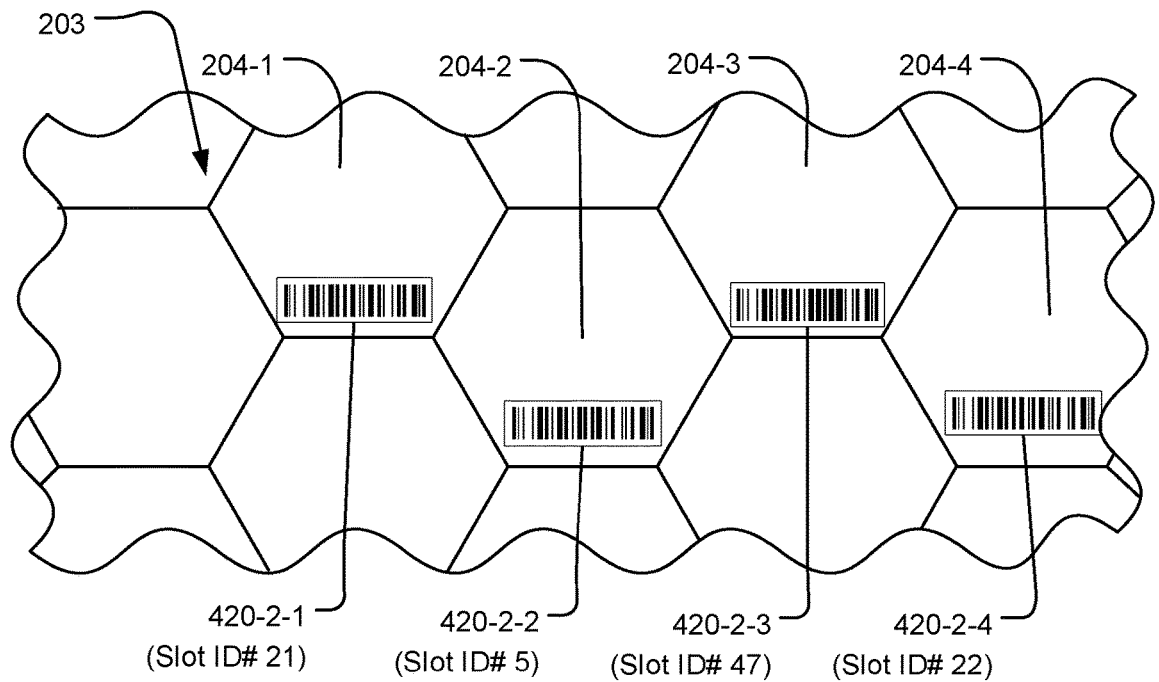
FIG. 5A is a plan view of a portion of the surface of the mounting dome (unwrapped from the mounting dome and flattened) showing a few of the mounting sockets, each of the mounting sockets having an optical code, e.g., barcode.

FIG. 5A is a plan view of a portion of the surface of the mounting dome 203 (unwrapped from the mounting dome and flattened) showing a few of the mounting sockets 204. Each of the mounting sockets 204 includes a socket ID module 420. The socket ID modules 420 are optically readable indicia, which are graphical representations of identification information (for example, for the mounting sockets 204) such as the socket IDs. More specifically, the socket ID modules 420 in the illustrated example are barcodes 420-2 representing the socket ID for each mounting socket 204. Other examples of optically readable indicia include matrix barcodes. In general, the optically readable indicia can be painted, engraved, or attached to the mounting sockets 204 with an adhesive, among other examples.

In the illustrated example, mounting socket 204-1 has barcode 420-2-1, which represents a socket ID of "21." Mounting socket 204-2 has barcode 420-2-2, which represents a socket ID of "5." Mounting socket 204-3 has barcode 420-2-3, which represents a socket ID of "47." Finally, mounting socket 204-4 has barcode 420-2-4, which represents a socket ID of "22." The socket ID module 420-1 of each mounting socket 204 is positioned along the bottom edge of each mounting socket 204.

Figure 5B:
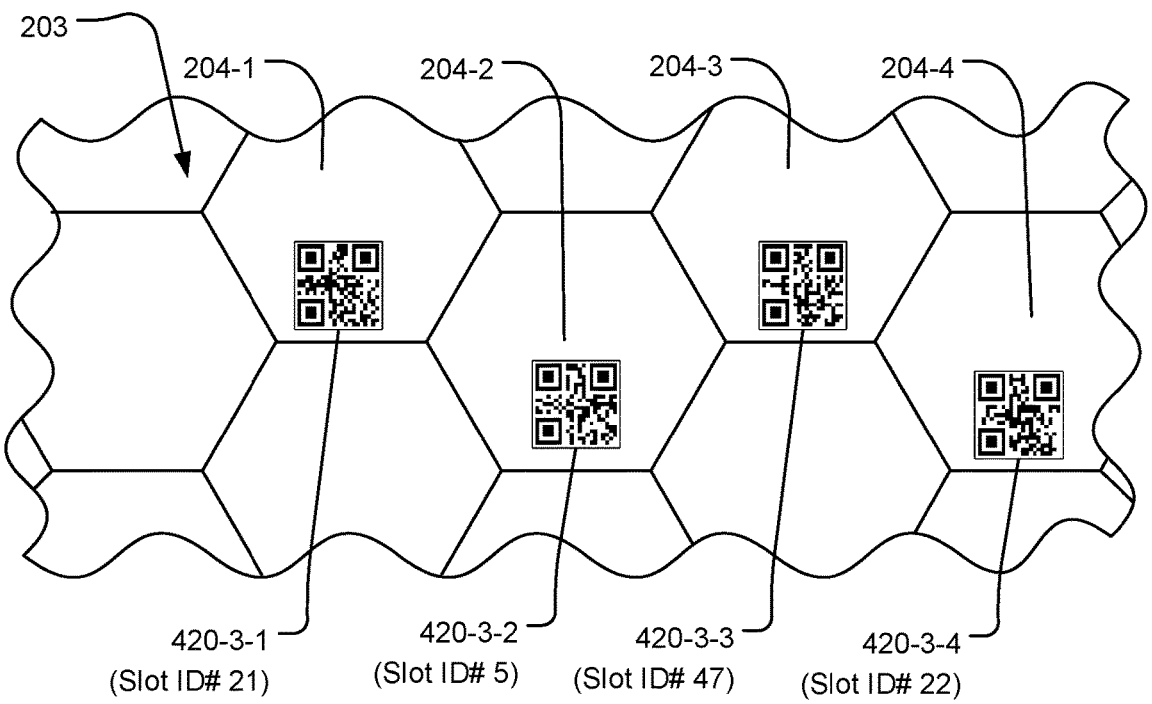
FIG. 5B is a plan view of a portion of the surface of the mounting dome (unwrapped from the mounting dome and flattened) showing a few of the mounting sockets, each of the mounting sockets having an optical code, e.g., matrix barcode.

FIG. 5B is a plan view of a portion of the surface of the mounting dome 203 (unwrapped from the mounting dome and flattened) showing a few of the mounting sockets 204. Here, the socket ID modules 420 are matrix barcodes 420-3 (for example, QR codes).

In the illustrated example, mounting socket 204-1 has matrix barcode 420-3-1, which represents a socket ID of "21." Mounting socket 204-2 has matrix barcode 420-3-2, which represents a socket ID of "5." Mounting socket 204-3 has matrix barcode 420-3-3, which represents a socket ID of "47." Finally, mounting socket 204-4 has matrix barcode 420-3-4, which represents a socket ID of "22."

Figure 6:
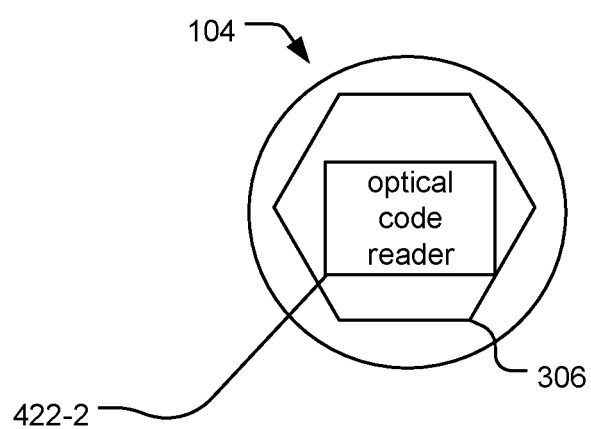
FIG. 6 is a bottom plan view of a sensor module, showing an optical code reader for reading the optical codes of the mounting sockets.

FIG. 6 is a bottom plan view of a sensor module 104, showing an ID reader module 422, specifically an optical code reader 422-2, for reading the optical codes 420-2, 420-3 of the mounting sockets 204. The optical code reader 422-2 reads the socket IDs by scanning the barcodes 420-2 and/or matrix barcodes 420-3.

In the illustrated example, the optical code reader 422-2 is located on the bottom surface 306 of the sensor module 104 such that the optical code reader 422-2 comes into visual contact with the optical codes 420-2, 420-3 of the mounting socket 204, to which the sensor module 104 is attached.

FIG. 7 is a sequence diagram illustrating the process by which the sensor module 104 reads the optical codes 420-2, 420-3 and sends the socket ID to the base unit 102, which then reports to a network video distribution system 701.

In step 702, the base unit 102 provides power to the sensor module 104. This can be done inductively as previously described or via a wired connection.

In step 704, the sensor module 104 initializes itself in response to receiving power from the sensor module 104. In one example, the sensor module 104 runs self-tests/diagnostic procedures and establishes wireless communications with the base unit 102 as well as sends unique identification information for the sensor module 104, such as a sensor module ID, to the base unit 102.

In step 706, the base unit 102 requests the socket ID 420 of the mounting socket 204 to which the sensor module 104 is attached. In step 1000, the sensor module 104 activates the optical code reader 422-2, which reads the socket ID for the mounting socket 204 to which the sensor module 104 is attached by scanning the optical code 420-2, 420-3 of the mounting socket 204.

In step 710, the sensor module 104 sends the socket ID to the base unit 102.

In step 712, the base unit 102 translates the socket ID received from the sensor module 104 into elevation/azimuth information for the sensor module's 104 field of view by, for example, retrieving the elevation/azimuth information associated with the socket ID from the configuration file 405.

In step 714, the sensor module 104 captures image data, which is then encoded and transmitted to the base unit 102 in step 716.

In step 718, the base unit 102 aggregates the image data from all of the sensor modules 104 or, alternately, stitches together the image data from each of the sensor modules 104 based on the elevation/azimuth information. In step 720, depending on the step 718, either the aggregated image data comprising the separate streams for each sensor module 104, along with the corresponding elevation/azimuth information, or the stitched image data, are sent to the network video distribution system 701. In one example, the elevation/azimuth information is included as meta-data of the image data.

Finally, in step 722, the network video distribution system 701 uses the elevation/azimuth information pertaining to each of the sensor modules 104 to stitch together the image data if it was not previously stitched together by the base unit 102.

Figure 8A:
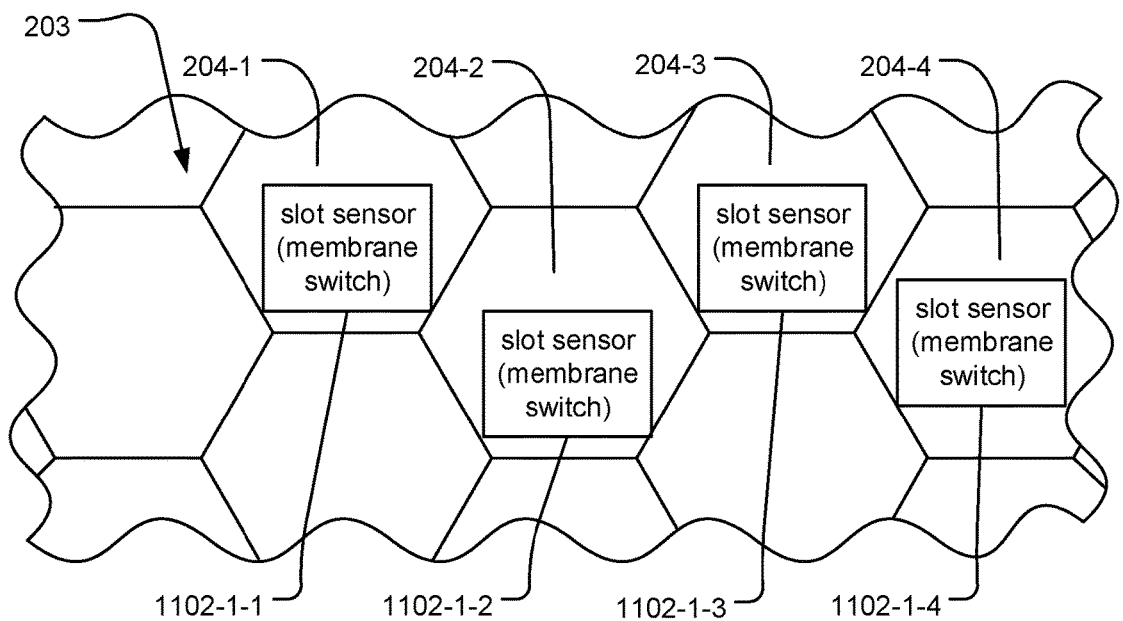
FIG. 8A is a plan view of a portion of the surface of the mounting dome (unwrapped from the mounting dome and flattened) showing a few of the mounting sockets, each of the mounting sockets having a sensor, i.e., membrane switch.

FIG. 8A is a plan view of a portion of the surface of the mounting dome 203 (unwrapped from the mounting dome and flattened) showing a few of the mounting sockets 204, each of the mounting sockets 204 having a sensor 1102 for detecting the presence of a sensor module attached to the mounting socket 204.

In general, the sensors 1102 interact with sensor modules 104 that are attached to the mounting sockets 204 in order to detect the presence of the sensor modules 104. Upon activation and/or detection of an attached sensor module 104, a signal is sent from the sensor 1102 to the base controller 400. The signal from the sensor 1102 to the base controller 400 can include ID information for the mounting sockets 204 such as the socket ID.

In the illustrated example, specifically, the sensors 1102 are membrane switches 1102-1, which are activated by attached sensor modules 104 compressing the membrane switches 1102-1.

Figure 8B:
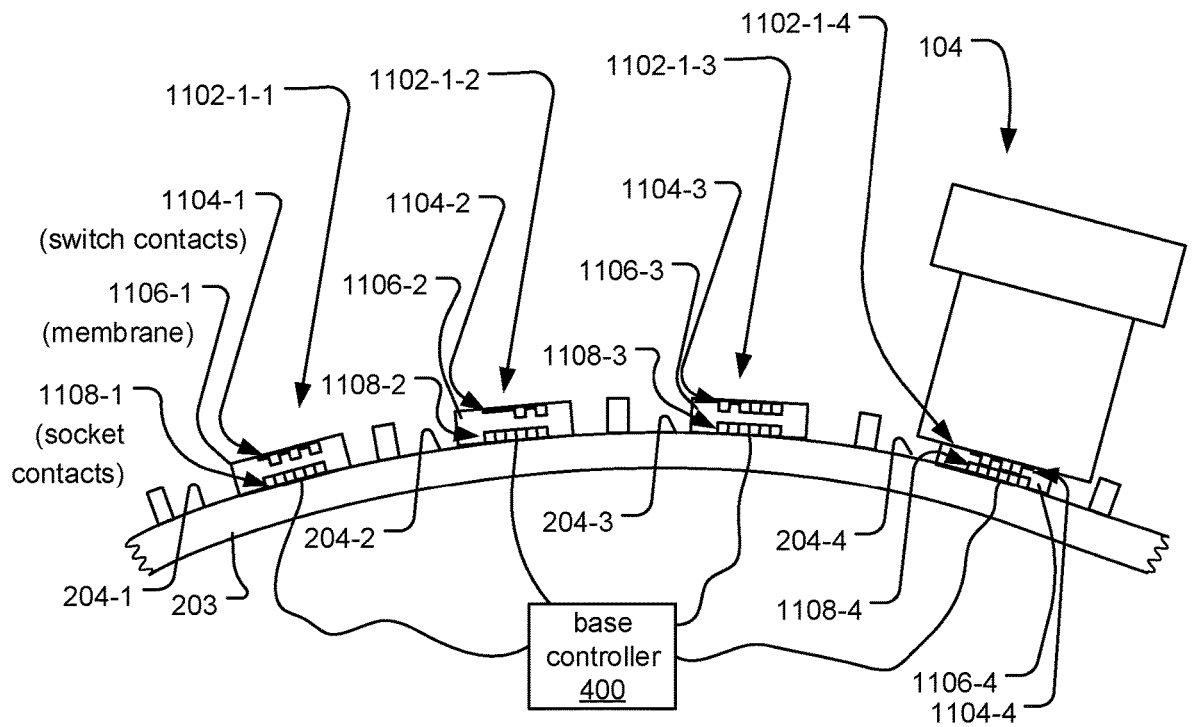
FIG. 8B is a schematic side view showing a few of the mounting sockets on the mounting dome, in which each of the mounting sockets includes a membrane switch.

FIG. 8B is a schematic side view showing a few of the mounting sockets 204 on the mounting dome 203, in which each of the mounting sockets 204 includes a membrane switch 1102-1.

Each membrane switch 1102-1 includes switch contacts 1104, a membrane 1106, and socket contacts 1108. The switch contacts 1104 and the socket contacts 1108 are electrical contacts of electrically conductive material, and the membrane 1106 is a flexible material to which the switch contacts 1104 are attached or integral. The socket contacts 1108 are on the surface of the mounting dome 203. The switch contacts 1104 and socket contacts 1108 are normally open, as, by default, the switch contacts 1104 are held in a position by the membrane 1106 such that the switch contacts 1104 and the socket contacts are separated 1108 unless downward pressure is applied to the membrane switch 1102-1. The membrane switches 1102-1 communicate with the base controller 400 via electrical connections between the base controller 400 and the membrane switches 1102-1.

In the illustrated embodiment, each membrane switch 1102-1 includes a range of one to six switch contacts 1104 and six socket contacts 1108 such that some of the socket contacts 1108 are paired with a corresponding switch contact 1104, while others are not paired with a corresponding switch contact 1104. Upon activation, the signal sent from the membrane switch 1102-1 to the base controller 400 is based on the different combinations of closed contact pairs. Different numbers and arrangements of the switch contacts 1104 represent different binary numbers, for example. In this way, each membrane switch 1102-1 sends unique identification information (such as the socket ID for the mounting socket 204) in response to being activated.

Also in the illustrated example, a sensor module 104 is attached to the rightmost mounting socket 204-4, compressing the membrane switch 1102-1-4.

Figure 9A:
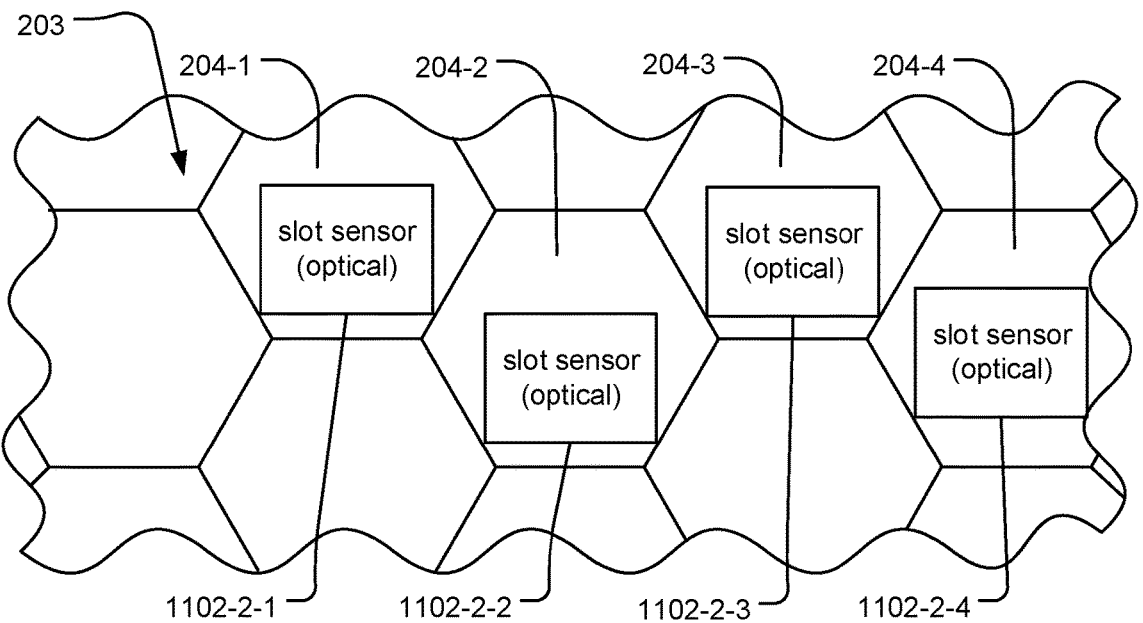
FIG. 9A is a plan view of a portion of the surface of the mounting dome (unwrapped from the mounting dome and flattened) showing a few of the mounting sockets, each of the mounting sockets having a sensor, i.e., optical sensor.

FIG. 9A is a plan view of a portion of the surface of the mounting dome 203 (unwrapped from the mounting dome and flattened) showing a few of the mounting sockets 204, each of the mounting sockets 204 having a sensor 1102, specifically an optical sensor 1102-2.

Figure 9B:
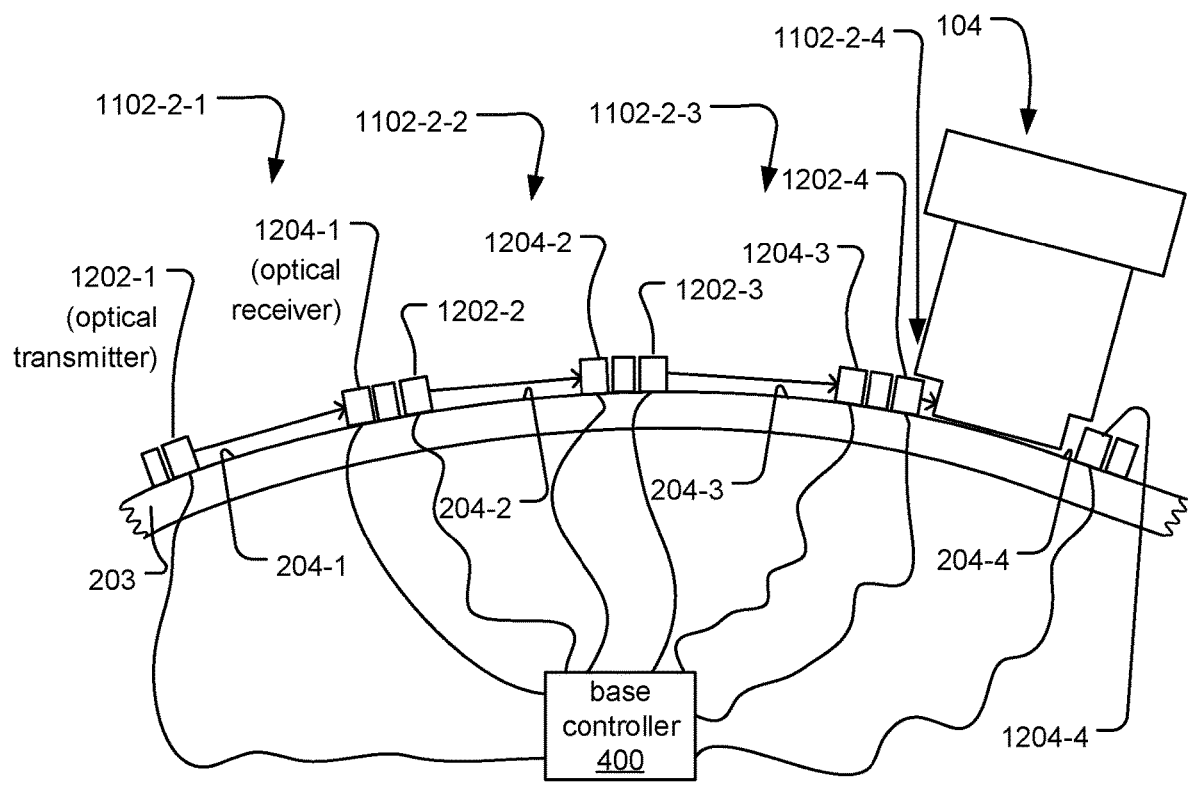
FIG. 9B is a schematic side view showing a few of the mounting sockets on the mounting dome, in which each of the mounting sockets includes a membrane switch.

FIG. 9B is a schematic side view showing a few of the mounting sockets 204 on the mounting dome 203, in which each of the mounting sockets 204 includes an optical sensor 1102-2.

Each optical sensor 1102-2 includes an optical transmitter 1202 and an optical receiver 1204 each positioned at opposing ends of the mounting socket 204. The optical transmitter 1202 transmits light which is detected by the optical receiver 1204. In response to an interruption of the transmission between the optical transmitter 1202 and the optical receiver 1204 (for example, by a sensor module 104 being attached to the mounting socket 204 and blocking the line of sight between the transmitter 1202 and receiver 1024), the optical sensor 1102-2 sends a signal to the base controller 400 via electrical connections between the base controller 400 and the optical sensors 1102-2. In order to identify the particular mounting socket 204 to which the sensor module 104 is attached, the signal sent from the optical sensor 1102-2 to the base controller 400 includes identification information for the mounting sockets 204 such as the socket ID (based on an initial configuration of the optical sensors 1102-2 during manufacture) and/or identification information for the optical sensors 1102-2, which is associated with socket IDs and/or elevation/azimuth information for the mounting sockets 204 in the configuration file 405, among other examples.

In the illustrated example, a sensor module 104 is attached to the rightmost mounting socket 204-4, interrupting the transmission between the optical transmitter 1202-4 and the optical receiver 1204-4.

Figure 10:
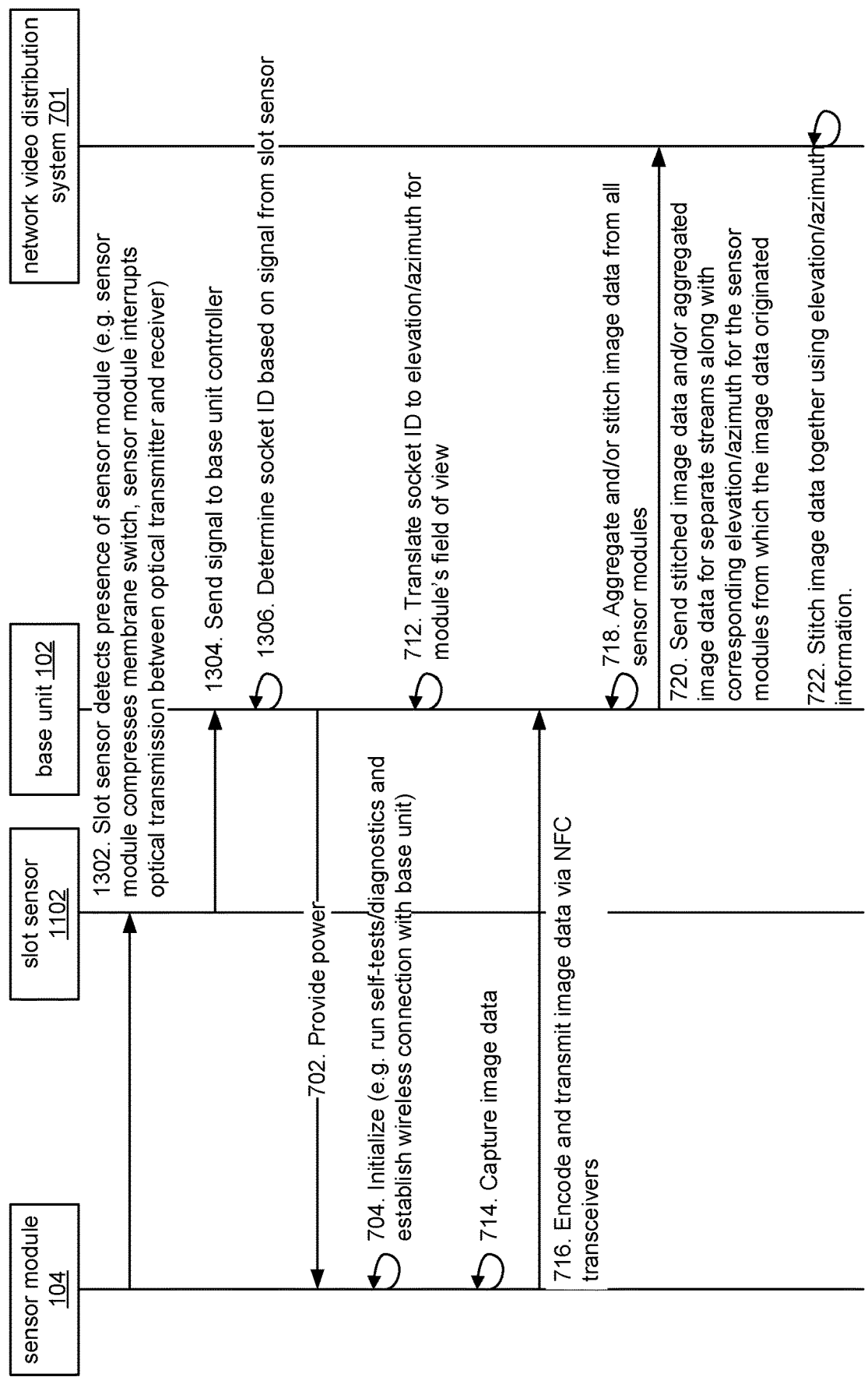
FIG. 10 is a sequence diagram illustrating the process by which the base unit determines the socket ID based on signals received from the sensors of the mounting sockets and then reports to the network video distribution system.

FIG. 10 is a sequence diagram illustrating the process by which the base unit 102 determines the socket ID for mounting sockets 104 based on signals received from the sensors 1102 of the mounting sockets 104 and then reports to the network video distribution system 701.

In step 1302, the sensor 1102 detects the presence of an attached sensor module 104 (for example, by activating in response to the sensor module 104 causing downward pressure on the membrane switch 1102-1, or in response to the sensor module 104 interrupting the transmission of light between the optical transmitter 1202 and the optical receiver 1204).

In step 1304, the sensor 1102 sends a signal to the base controller 400 of the base unit 102.

In step 1306, the socket ID for the mounting socket 204 to which the sensor module 104 is attached is determined based on the signal from the sensor 1102. In one example, the signal itself includes the socket ID. In another example, the signal includes identification information for the particular sensor 1102 that sent the signal, and the base controller 400 retrieves the associated socket ID from the configuration file 405.

Steps 702 through 704, and 712 through 722, then proceed as previously described.

Figure 11:
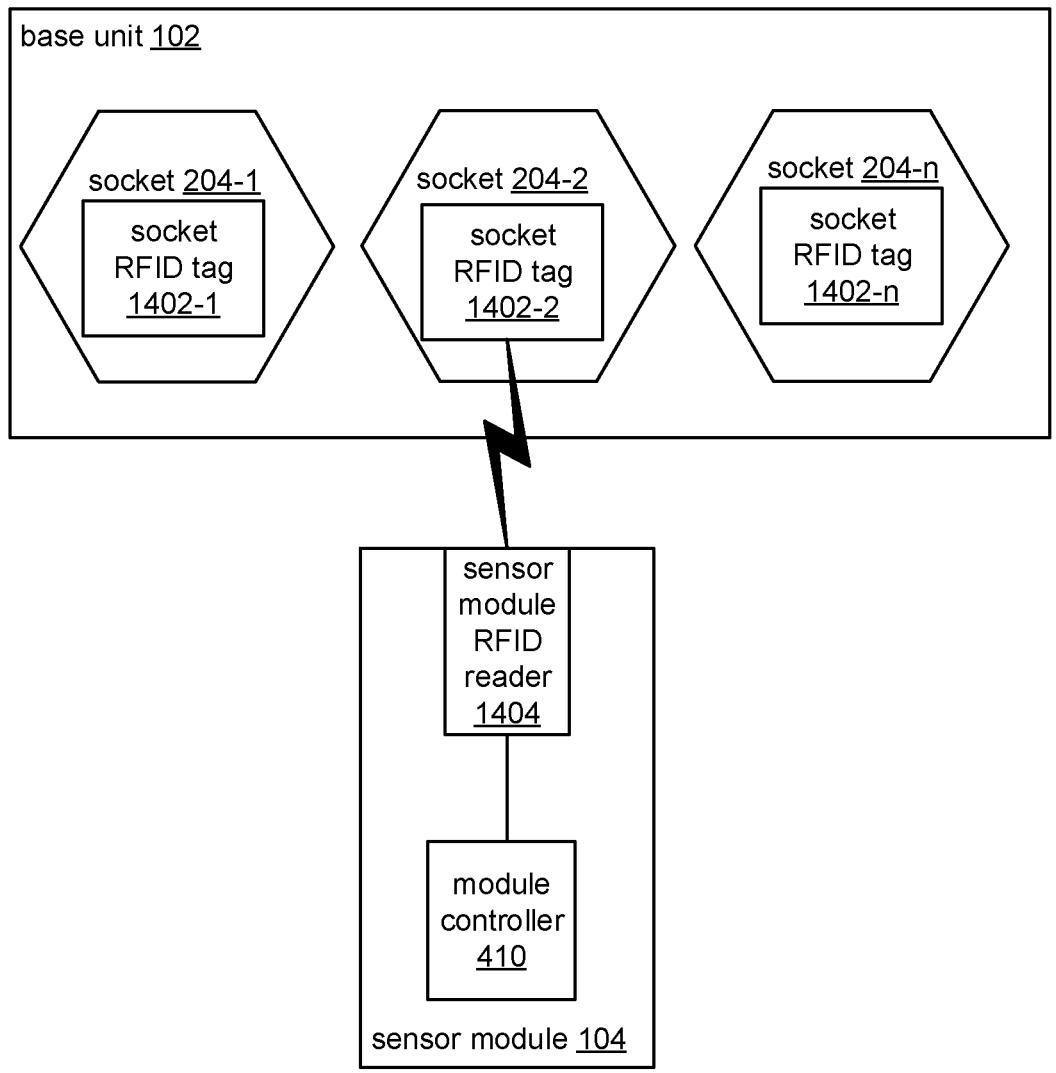
FIG. 11 is a schematic diagram of the base unit and sensor module showing a radio-frequency identification (RFID) reader of the sensor module reading an RFID tag of a mounting socket.

FIG. 11 is a schematic diagram of the base unit and sensor module showing a radio-frequency identification (RFID) reader 1404 of the sensor module 104 reading an RFID tag 1402-2 of a mounting socket 204.

In general, each mounting socket 204 includes a wireless transmitter such as an RFID tag 1402 for transmitting identification information. In one example, the identification information transmitted by the RFID tag 1402 is an identifier that is uniquely associated with the RFID tag 1402 when it is manufactured and further associated with the mounting sockets 204 via the configuration file 405. In another example, the identification information includes the socket ID itself. Similarly, the sensor modules 104 include wireless receivers such as RFID readers 1404 for receiving the identification information. The sensor module RFID reader 1404 communicates with the module controller 410 via an electrical connection between the module controller 410 and the sensor module RFID reader 1404.

In the illustrated example, three mounting sockets 204-1, 204-2 and 204-n of the base unit 102 are depicted, each one including RFID tags 1402-1, 1402-2 and 1402-3. The RFID reader 1404 of the sensor module 104 attaches to mounting socket 204-2 and scans the RFID tag 1402-2 of that mounting socket 204-2 and reads the identification information. The RFID reader 1404 sends the identification information to the module controller 410, which sends it back to the base unit 102.

Figure 12:
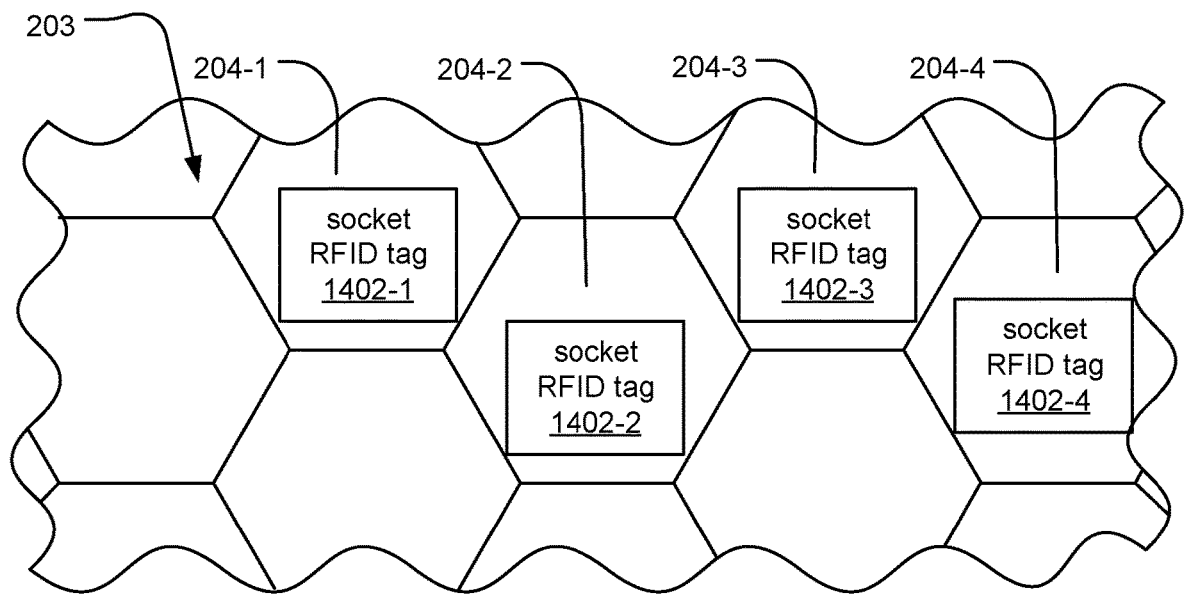
FIG. 12 is a plan view of a portion of the surface of the mounting dome (unwrapped from the mounting dome and flattened) showing a few of the mounting sockets, each of the mounting sockets having an RFID tag.

FIG. 12 is a plan view of a portion of the surface of the mounting dome 203 (unwrapped from the mounting dome and flattened) showing a few of the mounting sockets 204, each of the mounting sockets having an RFID tag 1402. The RFID tag 1402 is either located on the surface of the mounting dome 203 or positioned below the surface of the mounting dome 203 such that the RFID tag 1402 transmits wireless signals through the surface of the mounting dome 203 to the adjacent, attached sensor modules 104.

Figure 13:
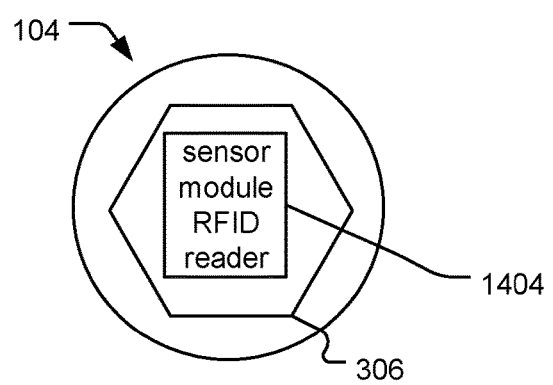
FIG. 13 is a bottom plan view of a sensor module, showing an RFID reader for reading the RFID tags of the mounting sockets.

FIG. 13 is a bottom plan view of a sensor module, showing the sensor module RFID reader 1404. Similar to the RFID tag 1402, the sensor module RFID reader 1404 is located on the bottom surface 306 of the sensor module 104 or positioned below the bottom surface 306 of the sensor module 104 such that the RFID reader 1404 receives wireless signals through the bottom surface 306 of the sensor module 104 from the RFID tag 1402 of the mounting socket 204 to which the sensor module 104 is attached.

Figure 14:
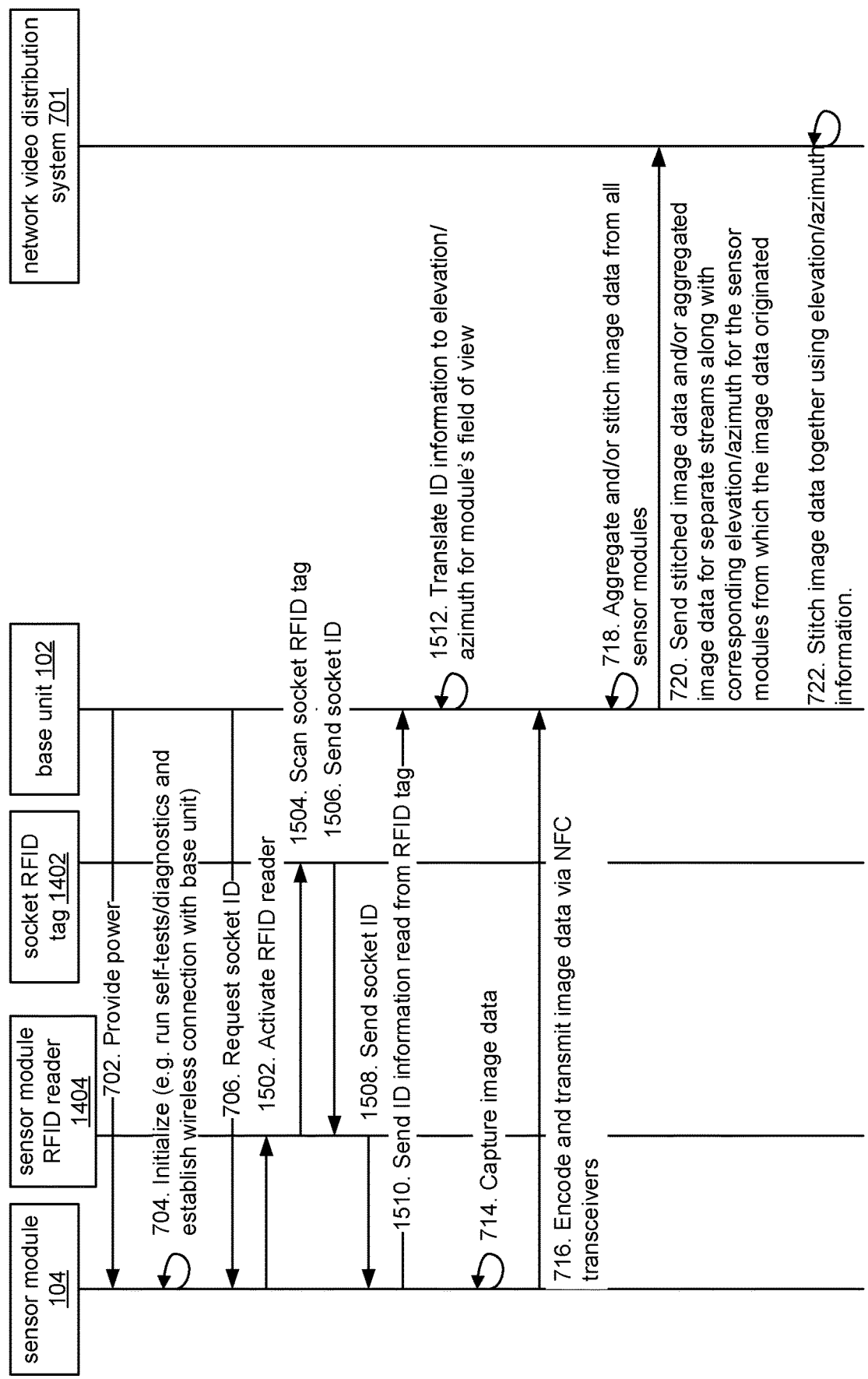
FIG. 14 is a sequence diagram illustrating the process by which the sensor module reads the RFID tag and sends the socket ID to the base unit, which then reports to the network video distribution system.

FIG. 14 is a sequence diagram illustrating the process by which the sensor module 104 reads the RFID tag 1402 and sends the socket ID to the base unit 102, which then reports to the network video distribution system 701.

Steps 702 through 706 proceed as previously described.

Now, however, in step 1502, the sensor module 104 activates the RFID reader 1404, which scans the RFID tag 1402 in step 1504. In response, the RFID tag 1402 sends the identification information for the mounting socket 204 on which it is located to the RFID reader 1404, which returns it to the module controller 410 of the sensor module 104 in step 1508.

In step 1510, the identification information that was read from the RFID tag 1402 is sent from the sensor module 104 to the base unit 102.

In step 1512, the base unit 102 translates the identification information that was read from the RFID tag 1402 to the elevation/azimuth information for the mounting socket 104 by accessing the configuration file 405.

Steps 714 through 722 then proceed as previously described.

Figure 15:
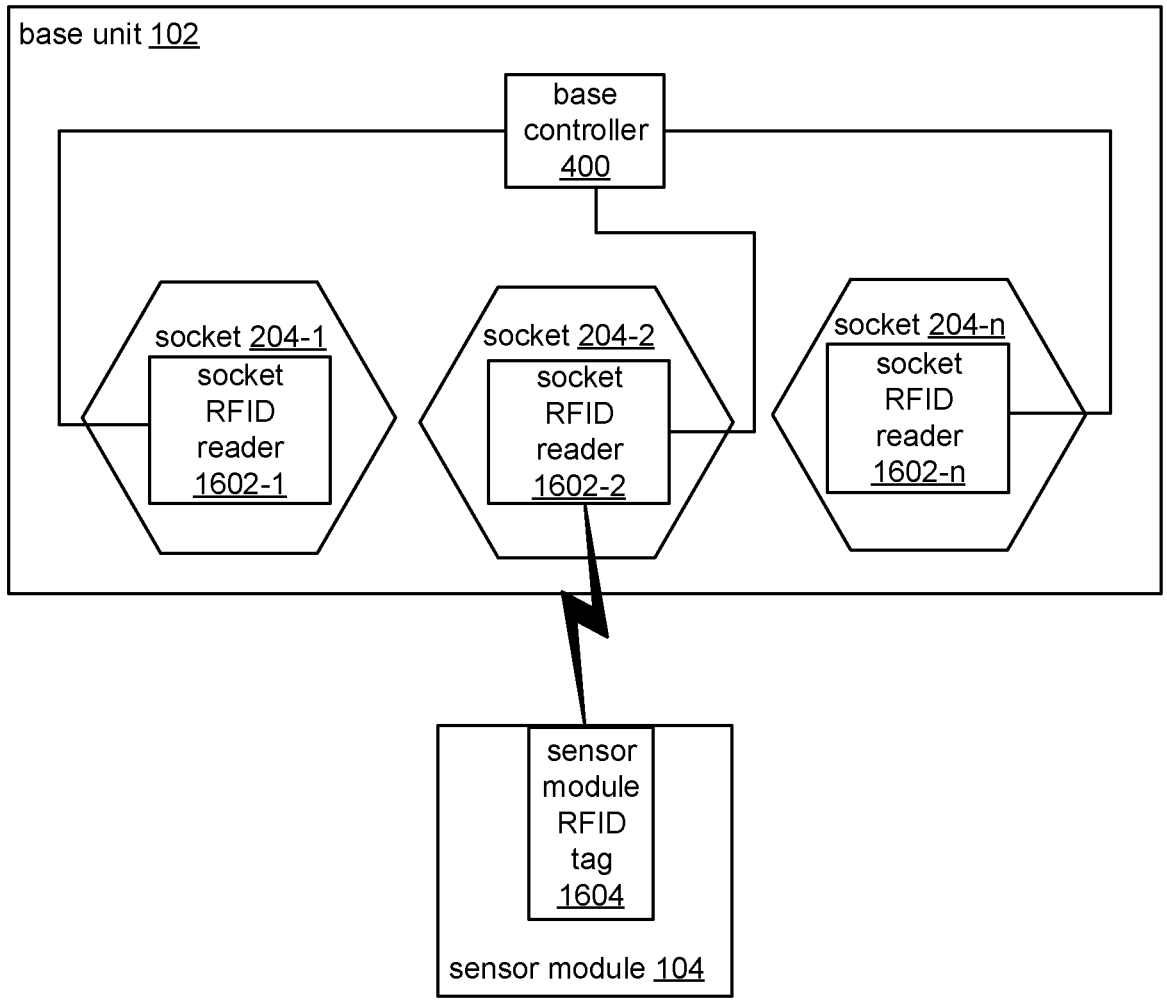
FIG. 15 is a schematic diagram of the base unit and sensor module showing an RFID reader of the mounting socket reading an RFID tag of the sensor module.

FIG. 15 is a schematic diagram of the base unit 102 and sensor module 104 showing an RFID reader 1602 of the mounting socket 204 reading an RFID tag 1604 of the sensor module 104.

In general, each mounting socket 204 includes a wireless receiver such as an RFID reader 1602 for reading identification information from the sensor module RFID tag 1604. Here, the identification information can include unique identification information for the RFID tag 1604 and/or for the sensor module 104 (such as a serial number), among other examples. Similarly, the sensor modules 104 include wireless transmitters such as RFID tags 1604 for transmitting the identification information. The socket RFID readers 1602 communicate with the base controller 400 via electrical connections between the module controller 410 and the socket RFID readers 1602.

In the illustrated example, three mounting sockets 204-1, 204-2 and 204-n of the base unit 102 are depicted. Each mounting socket 204 includes an RFID reader 1602. The sensor module 104 attaches to mounting socket 204-2 and transmits the sensor module device ID to the socket RFID reader 1602-2 for that mounting socket 204-2.

Figure 16:
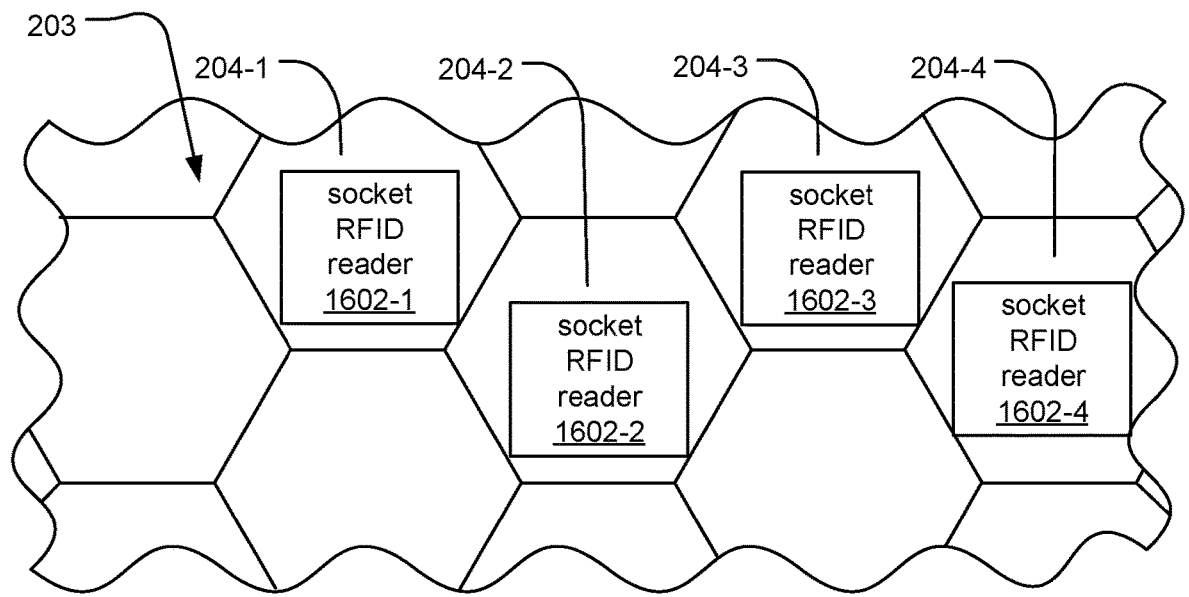
FIG. 16 is a plan view of a portion of the surface of the mounting dome (unwrapped from the mounting dome and flattened) showing a few of the mounting sockets, each of the mounting sockets having an RFID reader.

FIG. 16 is a plan view of a portion of the surface of the mounting dome 203 (unwrapped from the mounting dome and flattened) showing a few of the mounting sockets 204, each of the mounting sockets 204 having an RFID reader 1602. As before, the socket RFID reader 1602 is either located on the surface of the mounting dome 203 or positioned below the surface of the mounting dome 203 such that the RFID reader 1602 receives wireless signals through the surface of the mounting dome 203 from attached sensor modules 104.

Figure 17:
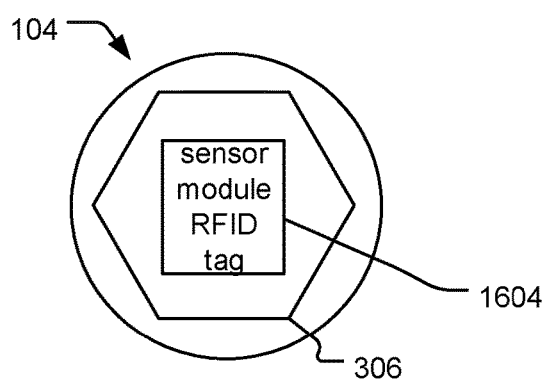
FIG. 17 is a bottom plan view of a sensor module, showing an RFID tag for transmitting the socket ID to the RFID reader of the mounting socket.

FIG. 17 is a bottom plan view of a sensor module, showing a sensor module RFID tag 1604 for transmitting the socket ID to the RFID reader 1602 of the mounting socket 204. As with the socket RFID reader 1602, the sensor module RFID tag 1604 is positioned on the bottom surface 306 of the sensor module 104 or positioned below the bottom surface 306 of the sensor module 104 such that the RFID tag 1604 transmits wireless signals through the bottom surface 306 of the sensor module 104 to the socket RFID reader 1602 of the mounting socket 204 to which the sensor module 104 is attached.

Figure 18:
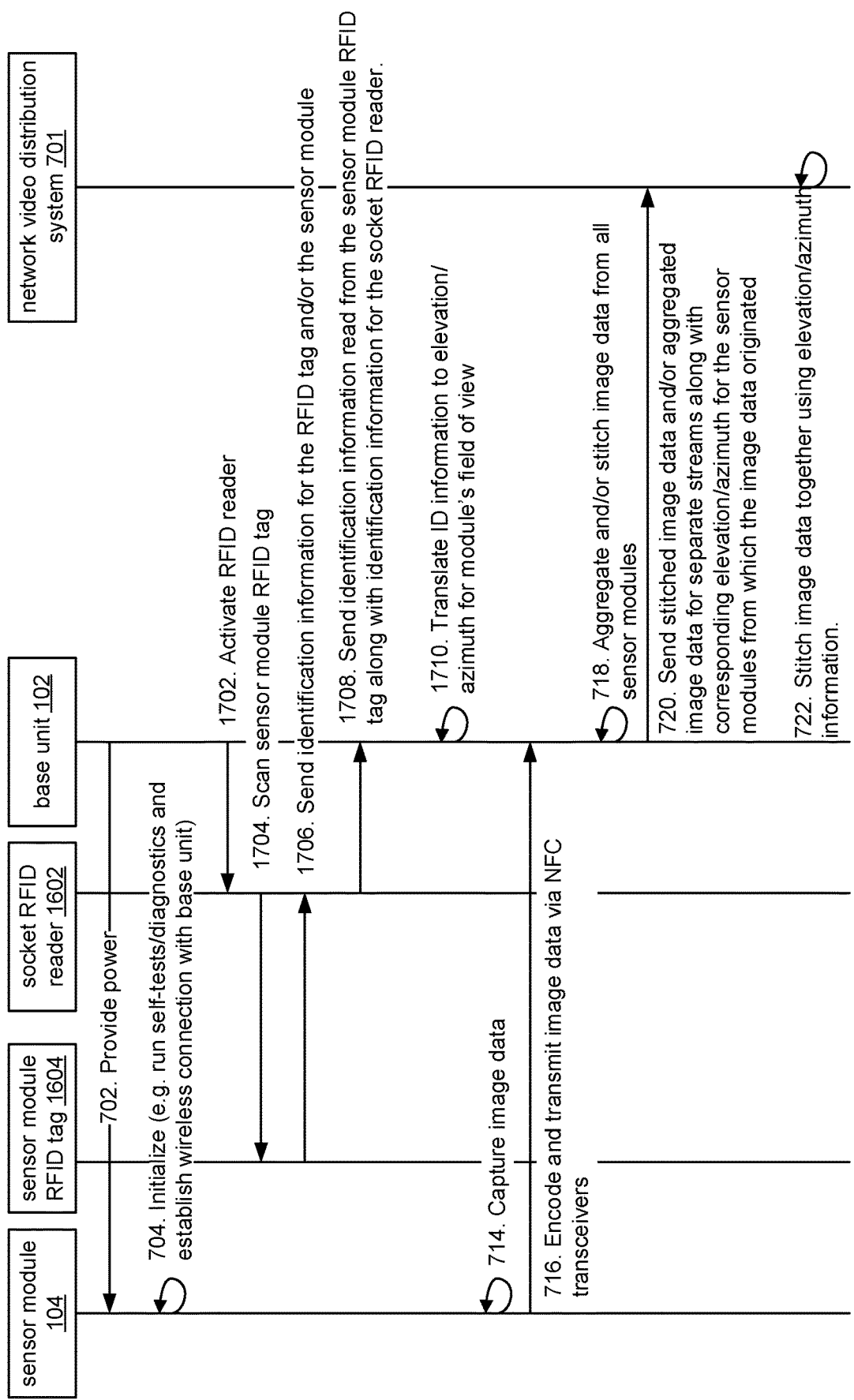
FIG. 18 is a sequence diagram illustrating the process by which the base unit reads the RFID tag of the sensor module and reports to the network video distribution system.

FIG. 18 is a sequence diagram illustrating the process by which the base unit 102 reads the RFID tag 1604 of the sensor module 104 and reports to the network video distribution system 701.

Steps 702 through 704 proceed as previously described.

Now, however, in step 1702, the base unit 102 activates the socket RFID reader 1604, which scans the RFID tag 1602 in step 1704. In response, the sensor module RFID tag 1604 sends the identification information for the RFID tag 1604 or for the sensor module 104 itself, to the socket RFID reader 1604, which returns it to the base controller 410 in step 1708 along with further identification information associated with the socket RFID reader 1602 such as a serial number for the reader or the socket ID itself. In the former example, the serial number for the RFID reader 1602 would be associated with the socket ID and/or the elevation/azimuth information in the configuration file 405 as previously described. In the latter example, the socket RFID reader 1602 would be initially configured with the socket ID for the mounting socket 204 to which it is associated during the process of manufacturing the base unit 102.

In step 1710, the base unit 102 translates the identification information received from the socket RFID reader 1602 to the elevation/azimuth information for the mounting socket 104 by accessing the configuration file 405. In one example, the base unit 102 receives a serial number for the socket RFID reader 1602 along with the identification information from the sensor module RFID tag 1604 and retrieves the socket ID and/or elevation/azimuth information for the mounting socket 104 associated with that particular serial number in the configuration file 405.

Steps 714 through 722 then proceed as previously described.

While this invention has been particularly shown and described with references to preferred embodiments thereof, it will be understood by those skilled in the art that various changes in form and details may be made therein without departing from the scope of the invention encompassed by the appended claims.

What is claimed is:

1. A security camera system, comprising:
   a base unit including a plurality of mounting points;
   sensor modules for attaching to the base unit at the mounting points and generating image data; and
   readable indicia and readers of the readable indicia for determining a relationship between the mounting points and the sensor modules, wherein the readable indicia are optically readable indicia or radio-frequency identification tags,
   wherein the readers are components of the sensor modules, the readable indicia are associated with the mounting points, the readable indicia provide identification information associated with the mounting points, and the identification information associated with the mounting points is sent by the sensor modules to the base unit.

2. The system as claimed in claim 1, wherein the readable indicia are barcodes and/or matrix barcodes, and the readers are optical code readers.

3. The system as claimed in claim 1, wherein the readable indicia are radio-frequency identification tags, and the readers are radio-frequency identification readers.

4. A security camera system, comprising:
   a base unit including a plurality of mounting points, each of the mounting points comprising a mounting point sensor for detecting the presence of a sensor module attached to the base unit at the mounting point; and
   sensor modules for attaching to the base unit at the mounting points and generating image data,
   wherein each mounting point sensor is positioned at the mounting point associated with the mounting point sensor such that attaching a sensor module to the base unit at the associated mounting point causes activation of the mounting point sensor based on interaction between the mounting point sensor and the attached sensor module, and the mounting point sensor detects the presence of the attached sensor module by sending a signal to a controller of the base unit in response to the activation, the signal indicating a position of the sensor module.

5. The system as claimed in claim 4, wherein the mounting point sensors include membrane switches, which are activated by attached sensor modules compressing the membrane switches.

6. The system as claimed in claim 4, wherein the mounting point sensors include optical sensors, which are activated by attached sensor modules interrupting transmission of light between optical transmitters and receivers of the optical sensors.

7. A method for configuring a multi-sensor security camera system including a base unit with a plurality of mounting points and sensor modules for attaching to the base unit at the mounting points and generating image data, the method comprising:
- readers, which are components of the sensor modules, reading readable indicia associated with the mounting points; and
- determining a relationship between the mounting points and the sensor modules based on the reading of the readable indicia, including the readable indicia providing identification information associated with the mounting points and the sensor modules sending the identification information associated with the mounting points to the base unit.

8. The method as claimed in claim 7, wherein the readable indicia are barcodes and/or matrix barcodes, and the readers are optical code readers.

9. The method as claimed in claim 7, wherein the readable indicia are radio-frequency identification tags, and the readers are radio-frequency identification readers.

10. A method for configuring a multi-sensor security camera system including a base unit with a plurality of mounting points and sensor modules for attaching to the base unit at the mounting points and generating image data, the method comprising:
- attaching the sensor modules to the mounting points, each of the mounting points comprising a mounting point sensor for detecting the presence of a sensor module attached to the base unit at the mounting point; and
- the mounting point sensors of the mounting points detecting the presence of the attached sensor modules,
- wherein each mounting point sensor is positioned at the mounting point associated with the mounting point sensor such that attaching a sensor module to the base unit at the associated mounting point causes activation of the mounting point sensor based on interaction between the mounting point sensor and the attached sensor module, and the mounting point sensor detects the presence of the attached sensor module by sending a signal to a controller of the base unit in response to the activation, the signal indicating a position of the sensor module.

11. The method as claimed in claim 10, further comprising detecting the presence of attached sensor modules by membrane switches of the mounting point sensors activating in response to the attached sensor modules compressing the membrane switches.

12. The method as claimed in claim 10, further comprising detecting the presence of the attached sensor modules by optical sensors of the mounting point sensors activating in response to the attached sensor modules interrupting transmission of light between optical transmitters and receivers of the optical sensors.

* * * * *